United States Patent [19]

Kawai et al.

[11] Patent Number: 4,761,644

[45] Date of Patent: Aug. 2, 1988

[54] DATA TRANSMISSION SYSTEM

[75] Inventors: Taneichi Kawai, Anjyo; Yuichi Murakami, Tokyo, both of Japan

[73] Assignee: Aisin Seiki Kabushikikaisha, Aichi, Japan

[21] Appl. No.: 870,193

[22] Filed: Jun. 3, 1986

[30] Foreign Application Priority Data

Jun. 3, 1985 [JP] Japan ................................ 60-120148
Jun. 3, 1985 [JP] Japan ................................ 60-120149

[51] Int. Cl.[4] ................................................ H04Q 1/00

[52] U.S. Cl. ........................... 340/825.31; 340/825.34; 307/10 AT

[58] Field of Search ............... 455/603, 343, 222, 296; 307/10 AT; 340/825.3–825.34, 825.69, 825.72, 64

[56] References Cited

U.S. PATENT DOCUMENTS 3,703,714 11/1972 Andrews ............................... 340/64
3,806,939 4/1974 Palmieri ...................... 340/825.69 X
4,107,613 8/1978 Queen et al. .................... 455/343 X
4,143,368 3/1979 Route et al. .................... 455/603 X
4,413,261 11/1983 Greenberg ...................... 307/10 AT

*Primary Examiner*—Ulysses Weldon
*Attorney, Agent, or Firm*—Sughrue, Mion, Zinn, Macpeak & Seas

[57] ABSTRACT

A control over data transmission and reception which is utilized in remotely controlled electronic vehicle lock system. During the standby mode, the power dissipation in a receiver is reduced to a required minimum level, while when a radio wave is received, the supply of power is automatically switched to enable the receiver for its proper functioning. A transmitter delivers a carrier for a given time interval in response to a switch being turned on, and then transmits a modulated wave which includes a switch code and an identification code. By utilizing a frequency modulation, the presence or absence of a wave being received is determined in accordance with noise level which appears at the demolulator output. When the presence of a wave being received is determined, the supply of power is switched, and is then maintained for a given time interval.

2 Claims, 19 Drawing Sheets

DATA TRANSMISSION SYSTEM

BACKGROUND OF THE INVENTION

The invention relates to a system for performing a given data transmission between a transmitter and a receiver such as a system which is used for remote operation of a door lock of an automobile, for example.

A system which operates a door lock of an automobile as by an electronic key is proposed in the prior art. In a system of this type, the electronic key is associated with an emitter which produces a given identification signal while a receiver is disposed on the part of the automobile so that a given unlocking operation takes place upon reception of the predetermined identification signal by the receiver.

When such system is modified to enable a remote operation, it is necessary that a power supply associated with the receiver be maintained on in order to enable its operation whenever the electronic key is operated. Specifically, while the electronic key or the emitter may be provided with a power switch, for example, which may be turned on whenever it is desired to operate the key, the system cannot be operable unless any power switch provided on the receiver is maintained on.

It is to be noted that a system of the type described must be capable of receiving and decoding a complex identification signal in order to prevent a theft, thus resulting in a complex arrangement of the receiver with consequent increase in the power dissipation. Hence, if the receiver is maintained in a condition to be fed from the power supply when the engine of the automoible is deactivated, the battery mounted on the automobile will be super-discharged, and may disable the starting of the engine in worst cases.

SUMMARY OF THE INVENTION

It is a first object of the invention to provide a standby unit for a receiver which can be maintained operable without operating a power switch and which requires a reduced amount of power dissipation during its standby mode.

The first object is accomplished in accordance with the invention, by providing wave reception decision means which determines the absence or presence of any wave received by wave receiving means, and power switching means responsive to a result of decision rendered by the decision means to effect a switching control to feed various electrical circuits within a data receiver unit.

When a radio wave is used as a remote controlling signal, for example, the decision means determines whether the radio wave is received, and the power switching means feeds various electrical circuits whenever the radio wave is received. When the radio wave ceases to be received, the power supplied to these circuits is reduced, thus minimizing the power dissipation. Generally, a receiver unit includes a receiver circuit and a control circuit which controls a door lock, for example, in response to the recognition of information contained in an output signal from the receiver circuit. It will be seen that there is no need to operate the control circuit, which need not be fed, whenever the radio wave is not received.

It will also be understood that where the receiver circuit includes an FM demodulator, while noises of a relatively high level appear at the output terminal of the receiver circuit when the radio wave is not being received, but the noise level will be significantly reduced upon reception of the radio wave or carrier. Accordingly, the presence or absence of any radio wave received can be determined by examining the noise level. When such decision means is used to recognize the reception, an increased difference in the signal level prevails between the time when the radio wave is being received and the time when the radio wave is not being received, and allows the presence or absence of any radio wave received to be determined if the supply voltage to the receiver circuit is substantially reduced below its rated value in order to reduce the power dissipation. When the supply voltage is reduced, the sensitivity of the receiver circuit is degraded, preventing the signal contained in the radio wave from being decoded. This presents no problem, however, since it is only necessary that the presence or absence of any radio wave received be detected during the standby mode when the radio wave is not being received.

Accordingly, in a preferred embodiment of the invention, the noise level of an electrical signal which is obtained at the output terminal of the receiver circuit is examined to determine if any external signal is being received. In the event it is found that no signal is being received, the supply to the control circuit is reduced to zero and the supply voltage to the receiver circuit is reduced as compared from a normal value. In this manner, the power dissipation which occurs within the receiver unit during the standby mode can be minimized.

In general, it is relatively difficult to determine the presence or absence of a signal being received. In addition, there is a need that the receiver be enabled for reception at a time before the transmitter begins to transmit data. Accordingly, in order to assure that every data be received without missing any part thereof, the receiver must be rapidly returned to its normal receiving condition from the standby condition once the signal is received. A microcomputer which exhibits a slow response is hardly adaptible to such application.

Therefore, it is a second object of the invention to provide a data transmission system which minimizes the power dissipation on the part of a receiver during its standby mode and which enables every data to be received by the receiver when a transmitter begins to transmit data.

The second object is accomplished in accordance with the invention by providing a combination of a data transmitter unit comprising at least one switch means, wave generating means, and first electronic control means responsive to an operation of the switch means for controlling a carrier output from the wave generating means and for controlling a modulation of the carrier by a signal including information which depends on the switch operation at least a given time interval after the carrier wave begins to be outputted;

and a data receiver unit comprising switching control means which controls an electrical equipment such as an electronic lock on a vehicle, for example, wave receiving means including demodulating means for receiving a wave delivered from the wave generating means to output a given electrical signal, second electronic control means for decoding information contained in the electrical signal which is demodulated by the demodulator means and for controlling the switching control means in accordance with a decoded result, wave reception decision means for monitoring the electrical signal which is output from the wave receiving means, for determining the presence or absence of any wave being received and for delivering an electrical signal which represents a result of decision, and power switching means for switching power which is supplied to at least the second electronic control means in response to the electrical signal which is output from the wave reception decision means.

More specifically, when the switch means is operated in the data transmitter unit, an unmodulated carrier alone is transmitted for a given time interval before an intended transmission takes place. In response to the carrier received, the data receiver unit establishes a power supply condition which enables the reception of data. Thus, the presence or absence of any wave received is easily determined by examining if the carrier is present. By way of example, if the receiver unit includes a frequency discriminator, white noises of a relatively high level will appear at the output terminal of the discriminator when the carrier is not being received, but the noise level will be reduced significantly upon reception of the carrier. Thus, the detection of the noise level enables the presence or absence of the carrier being received to be determined. However, once the modulation is initiated, a signal appears at the output terminal of the frequency discriminator to make it difficult to provide an accurate determination concerning the presence or absence of any signal being received. Accordingly, in a preferred embodiment of the invention, once the presence of a wave received is detected in response to the reception of the carrier, the prevailing power supply condition is maintained in a self-holding manner until a given time interval passes.

In the serial transmission of binary data, it is preferred that data sampling timing be established toward the center of a time interval during which data corresponding to each bit appears. A control over the synchronization can take place simply if the timings on the transmitting and receiving side are performed using clock pulses of a completely equal frequency. However, in the event the frequencies are offset from each other, there occurs a time offset between the transmitting and the receiving side during the time a number of bits are being sampled. It will be appreciated that the occurrence of such a time offset gives rise to the possibility of producing an error in the data received as a result of the sampling operation which may take place at a timing when no data is present or at a time when data is switched between binary levels.

Accordingly, in the preferred embodiment of the invention, the second electronic control means updates the content of a given memory incrementally at a time period which is sufficiently less than the bit period of the data being transmitted so that the content of the memory is preset to a predetermined value for each change in the level of the electrical signal which is output from the wave receiving means, and the electrical signal which is output from the receiving means is sampled to produce data bit each time a value in the memory reaches a given value. With this arrangement, the content of the memory is modified for each change in the level of the data being transmitted, and the sampling operation takes place at a corresponding timing. Hence, if the clock period used on the receiving side is different from the clock period used on the transmitting side, the sampling timing is corrected for each occurrence of a change in the data level, assuring a synchronization between the transmitting and the receiving side.

A carrier for a signal which is to be transmitted between the data transmitter unit and the data receiver unit may comprise a radio wave, an ultrasonic wave, light or magnetic.

Other objects and features of the invention will become apparent from the following description of an embodiment thereof with reference to the drawings.

Figure 1:
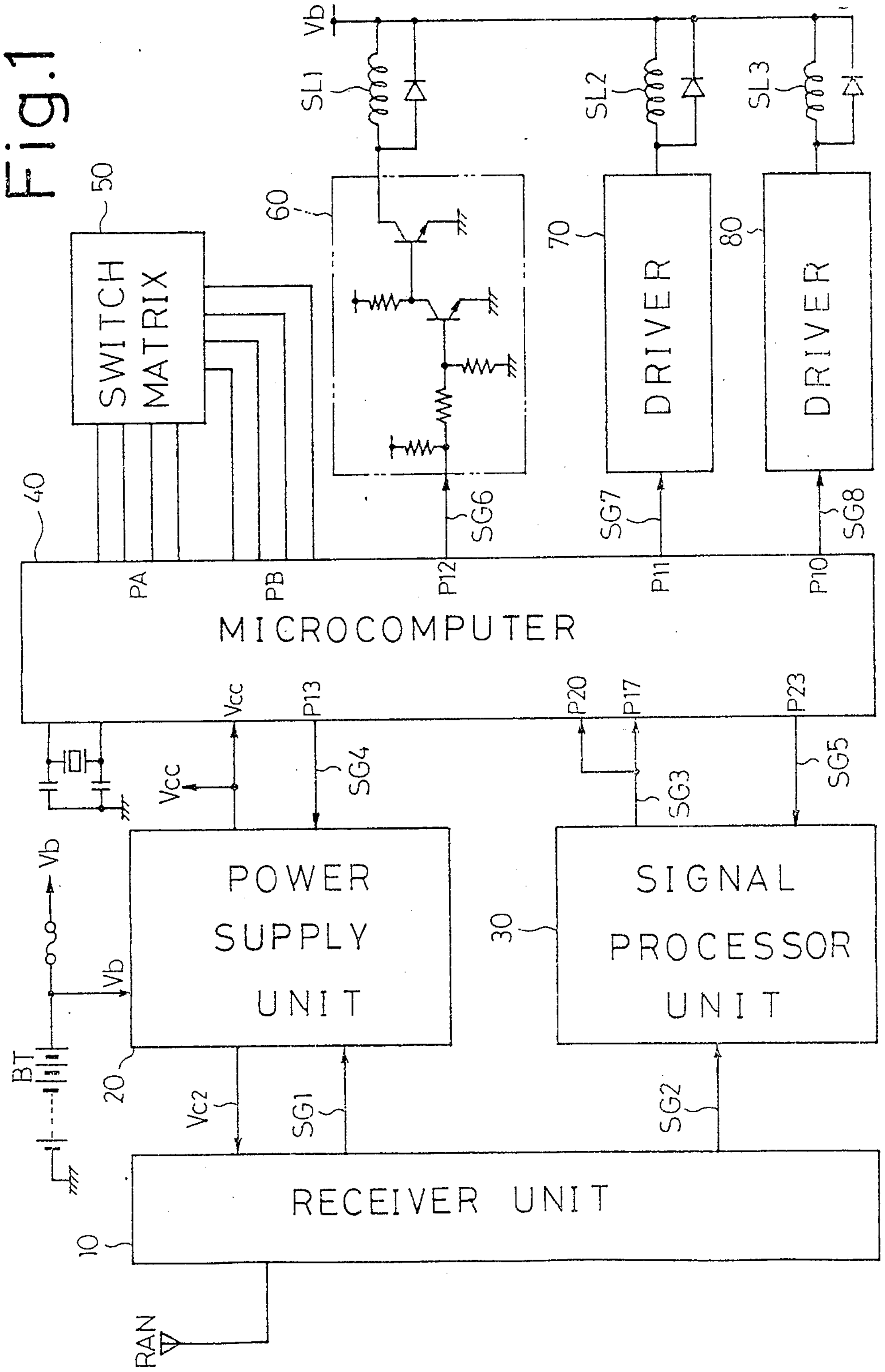
FIG. 1 is a block diagram of an electronic vehicle lock system in which the invention is implemented.
Figure 3:
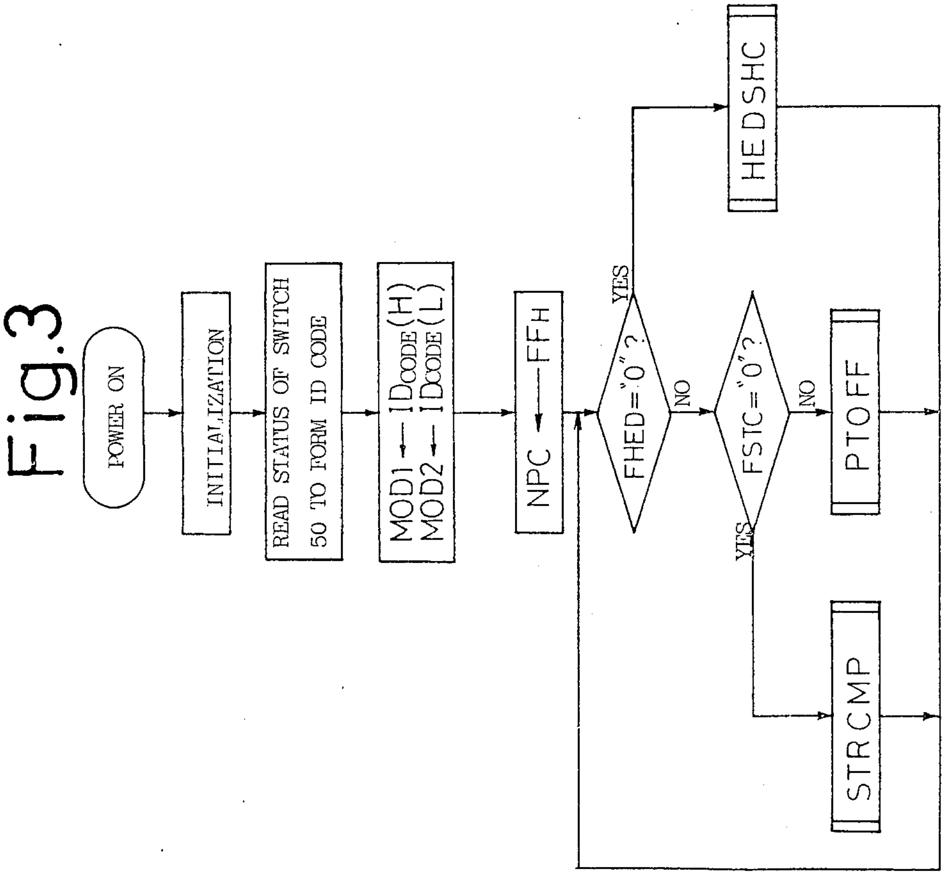
Figure 5:
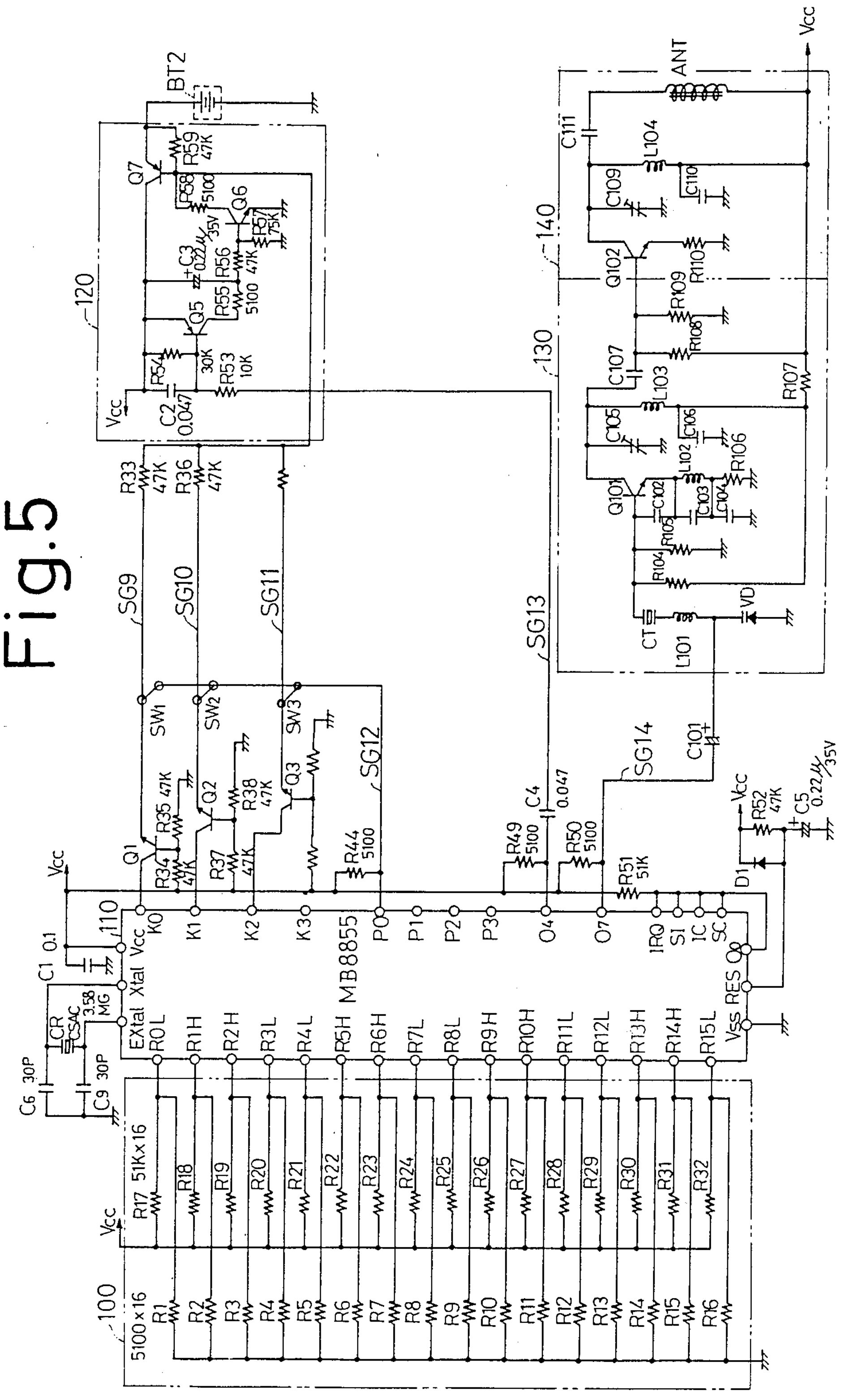

FIGS. *2a, 2b* and *2c* are circuit diagrams of a receiver unit, a signal processor unit and a power supply unit shown in FIG. 1;

FIG. 3 and FIGS. *4a, 4b, 4c, 4d, 4e* and *4f* are flowcharts illustrating operations undertaken by a microcomputer shown in FIG. 1;

FIG. 5 is a circuit diagram of an unlock operating board which transmits a radio wave to the vehicle system shown in FIG. 1;

FIGS. *6a, 6b, 6c, 6d, 6e* and *6f* and FIGS. *7a, 7b, 7c, 7d, 7e, 7f, 7g* and *7h* are flowcharts illustrating operations by a microcomputer shown in FIG. 5;

FIG. *8a* is a timing chart illustrating a bit arrangement of data which is transmitted from the transmitting to the receiving side; and FIG. *8b* is a timing chart illustrating the timing for sampling data on the receiving side.

DESCRIPTION OF PREFERRED EMBODIMENT

Referring to the drawings, an embodiment of the invention will be described. FIG. 1 shows a receiving side or a vehicle system for a electronic lock system used with an automobile which is constructed according to the invention. Specifically, the vehicle system includes a receiver unit 10, a power supply unit 20, a signal processor unit 30, a microcomputer (hereafter abbreviated as CPU) 40, a switch matrix 50 and drivers 60, 70, 80.

The receiver unit 10 is connected to a receiving antenna RAN. The power supply unit 20 includes an input line Vb, to which a battery BT on the vehicle is connected. The switch matrix 50 includes 16 switches, in this example, which are connected to ports PA and PB of CPU 40 in a matrix configuration. The status of these 16 switches correspond to the sole identification code of the vehicle system itself.

The drivers 60, 70 and 80 have their output terminals connected to solenoids SL1, SL2 and SL3, respectively, which control the unlocking of a right side door lock, a left side door lock and a trunk lock, respectively. It is to be noted that the drivers 70 and 80 are constructed in an identidal manner with the driver 60. Briefly describing the operation, the receiver unit 10 amplifies and demodulates a signal which is intercepted at the antenna RAN. The demodulated signal is delivered on a signal line SG2. The receiver unit 10 also delivers a binary signal which indicates the presence or absence of a signal being received on another signal line SG1. The receiver unit 10 is fed from a supply line Vc2, to which either one of two voltages (5 V or 2.5 V) is supplied from the power supply unit 20 depending on the level of the signal line SG1.

The signal processor unit 30 amplifies a signal appearing on the signal line SG2 and converts it into a binary signal of TTL level which is output on a signal line SG3.

CPU 40 decodes a serial binary signal appearing on the signal line SG3, and controls the status of output ports P10, P11 and P12, or unlocking solenoids SL1, SL2 or SL3 in accordance with the result of decoding. In addition, CPU 40 delivers a square wave signal (hereafter referred to as a pumping signal) on a signal line SG4, indicating that it is in operation.

The power supply unit 20 outputs a voltage of 5 V on the supply line Vc2 and outputs a voltage of 5 V on a supply line Vcc when the signal line SG1 assumes a high level H while it changes the voltage applied to the supply line Vc2 to about 2.5 V and changes the voltage applied to the supply line Vcc to 0 V when the signal line SG1 changes to a low level L. However, if the pumping signal is present on the signal line SG4, the power supply unit maintains the same condition as occurs for the high level H on the signal line SG1 if the signal line SG1 actually assumes the low level. In other words, CPU 40 is effective to provide a self-holding action for the power supply by delivering the pumping signal on the signal line SG4.

As will be described later, the regular binary signal on the signal line SG3 contains information representing a predetermined identification code of the transmitter unit. CPU 40 compares the identification code of the transmitter unit with the identification code of the receiver unit which is determined by the switch matrix 50, and performs a given operation when they match.

Figure 8A:
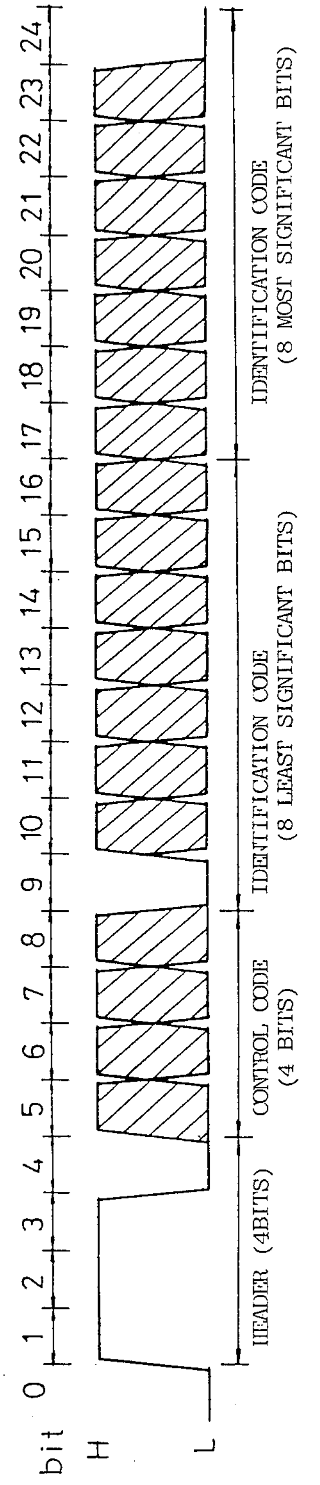

The construction of information which is transmitted between the transmitter and the receiver of the electronic lock system will now be described. In the example shown, the signal transmitted comprises a serial binary signal and one unit of information comprises 24 bits as shown in FIG. 8*a*. Specifically, the unit comprises 4 bit header having a predetermined pattern of H-H-H-L followed by a control code including 4 bits and an identification code including 16 bits. The first bit (bit 9) and the 16th bit (bit 24) of the identification code are fixed to the low level L. The header information is utilized to provide a synchronization for one unit or a serial data comprising 24 bits while the control code is used to indicate an instrument which is to be controlled. In FIG. 8*a*, those bits which are shown hatched may assume either high level H or low level L depending on the particular use.

Figure 2A:
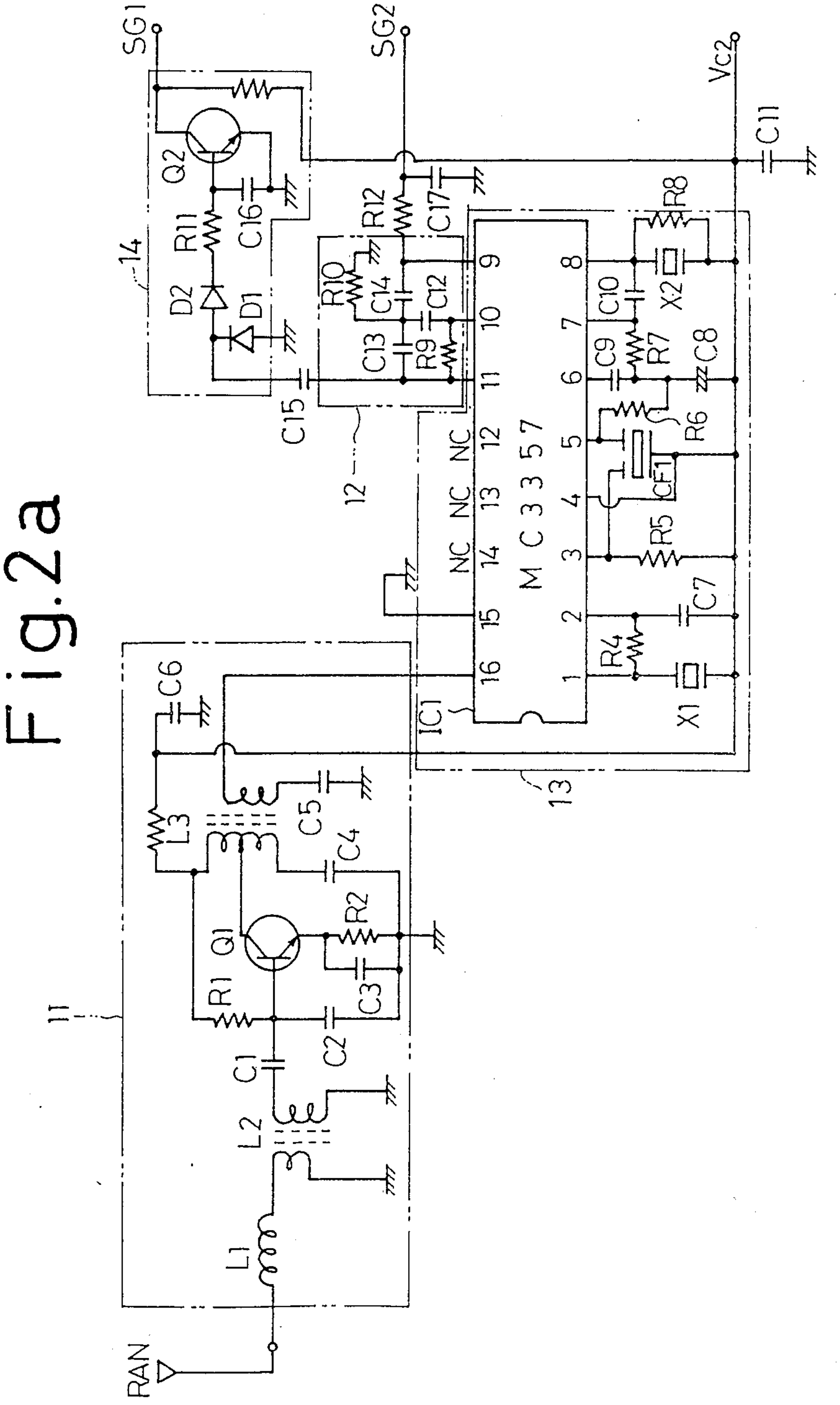

FIG. 2*a* shows the specific arrangement of the receiver unit 10 shown in FIG. 1. Specifically, the unit includes four major blocks 11, 12, 13 and 14. The block 11 represents a high frequency amplifier circuit and the block 13 essentially comprises an integrated circuit IC1. Specifically, the integrated circuit IC1 is formed by a model MC3357 manufactured by Motorola Co., internally including a local oscillator, a mixer, a limiter-amplifier, a quadrature discriminator and an active filter. Thus, the block 13 demodulates a high frequency signal which is frequency modulated, or more exactly modulated in accordance with frequency shift keying (FSK). The demodulated signal appears at a pin 9 of the integrated circuit IC1 to be delivered on the signal line SG2. In the integrated circuit IC1, a ceramic filter is shown at CF1 while crystals are shown at X1 and X2.

The block 12 represents a filter while the block 14 represents a noise detector circuit which determines if noises are present at the output terminal of the block 12. When the receiver is not receiving a radio wave, white noises of a relatively high level appear at the output terminal of the filter 12. Accordingly, there appears a high level H at the output terminal of a rectifier comprising diodes D1 and D2, whereby a transistor Q2 is turned on to cause the signal line SG1 to assume the low level L. However, when the receiver receives a radio wave, noises cease to appear at the output terminal of the filter 12, whereupon the transistor Q2 is turned off to allow the signal line SG1 to assume the high level H. When the radio wave is being received, the demodulated signal appears at the output terminal of the filter 12 if the radio wave is modulated, giving rise to the probability that the signal line SG1 assumes the low level L. To accommodate for this, in this example, when the transmitter delivers a radio wave, it provides an initial unmodulated period of about 200 msec. In this manner, it is assured that the signal line SG1 assumes the high level H at least immediately after the radio wave has been received.

As will be described later, the voltage applied to the supply line Vc2 may be either 5 V or 2.5 V. When the voltage of 2.5 V is applied, the current drawn by the individual circuits will be significantly reduced as compared when the supply voltage of 5 V is applied, even though the sensitivity is reduced. However, the reduced sensitivity is sufficient to enable the presence or absence of any radio wave being received to be determined.

Figure 2B:
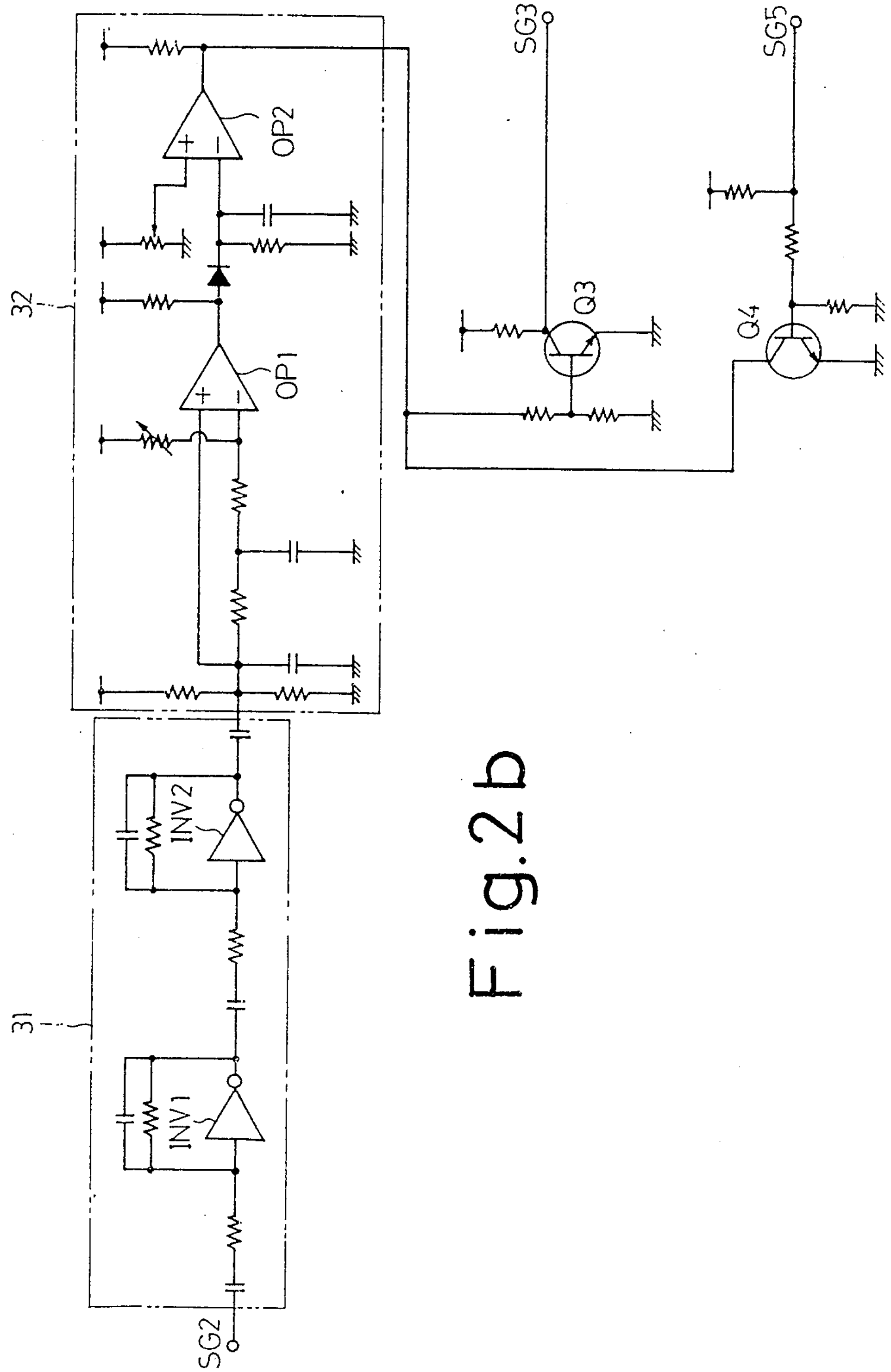

FIG. 2*b* shows the specific construction of the signal processor unit 30 shown in FIG. 1. Specifically, the unit 30 includes an amplifier circuit 31 and a level comparator circuit 32, which function to convert a weak signal appearing on the signal line SG2 into a binary signal of TTL (transistor-transistor-logic) level which is then delivered on the signal line SG3. A transistor Q4 is normally turned off. CMOS inverters INV1 and INV2 are provided within the amplifier circuit 31 and function as amplifiers.

Figure 2C:
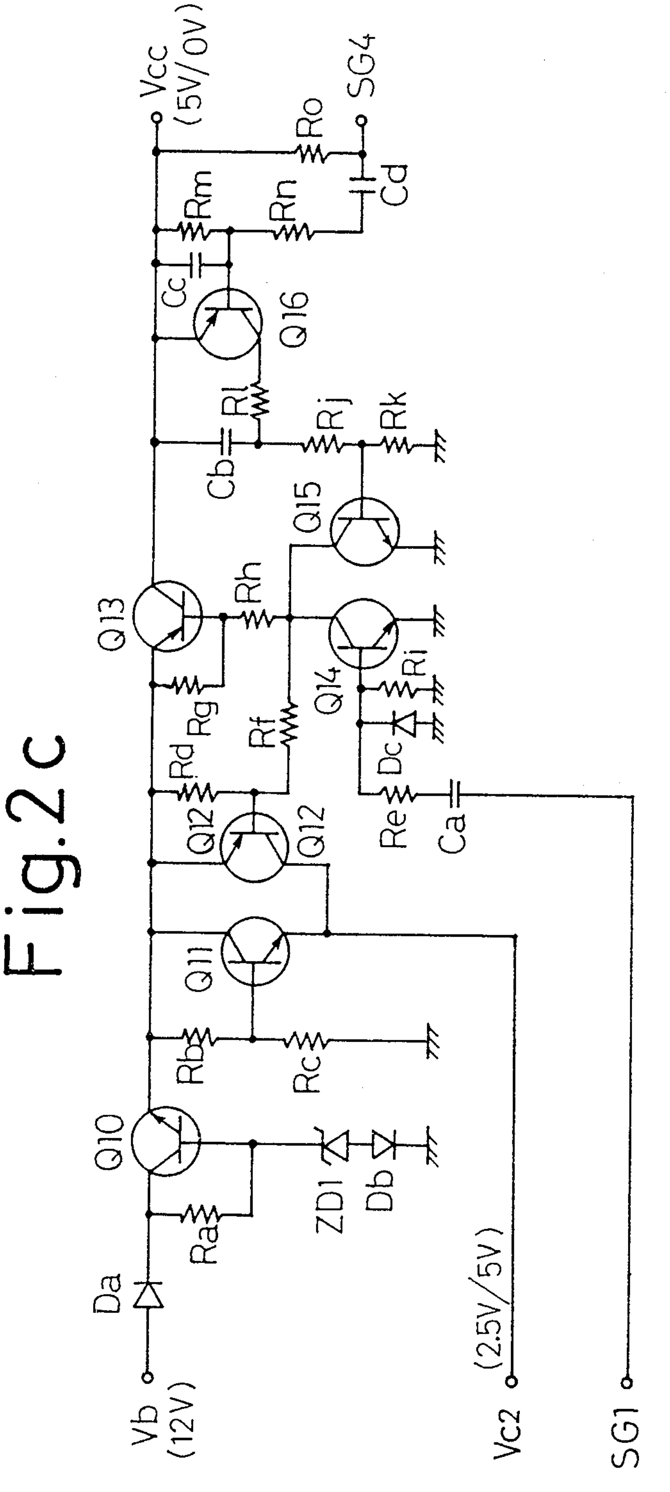

FIG. 2*c* shows the specific construction of the power supply unit 20 shown in FIG. 1. Specifically, a transistor Q10 has its base terminal clamped to a fixed voltage through a Zener diode ZD1 and a diode Db, thus allowing a voltage of about 5 V to be output from the emitter terminal of the transistor Q10.

The voltage applied to the supply line Vc2 is determined by the condition of a transistor Q12. When the transistor Q12 is off, the voltage applied to the supply line Vc2 is determined by the division ratio of resistors Rb and Rc connected to the base terminal of the transistor Q11 and by the emitter voltage of the transistor Q10. Since the emitter voltage of the transistor Q10 is equal to 5 V, as mentioned previously, the voltage supplied to the supply line Vc2 will be about 2.5 V when the transistor Q12 is off. However, when the transistor Q12 is turned on, a current flow through the transistor Q12 from the emitter of the transistor Q10 is enabled to the supply line Vc2, thus raising its voltage about 5 V.

On the other hand, the voltage applied to the supply line Vcc depends on the condition of a transistor Q13. Specifically, when the transistor Q13 is off, the supply line Vcc assumes 0 V, but when the transistor Q13 is turned on, a current flow from the emitter terminal of the transistor Q10 through the transistor Q13 allows a voltage of about 5 V to be applied to the supply line Vcc.

The transistors Q12 and Q13 are turned on or off by a voltage developed at the collector terminal of a transistor Q14 (or transistor Q15). Specifically, when the both transistors Q14 and Q15 are off, the both transistors Q12 and Q13 are also off. If at least one of the transistors Q14 and Q15 is turned on, the both transistors Q12 and Q13 are turned on. The transistor Q14 is turned on when the signal line SG1 assumes the high level H, and is turned off when the signal line assumes the low level L.

The transistor Q15 is turned on when a transistor Q16 is on, and is turned off when the transistor Q16 is off. However, there is a certain length of time lag since the transistor Q16 is turned off until the transistor Q15 is turned off due to the effect of a time constant which is determined by a capacitor Cb and resistors. The transistor Q16 is turned on in response to the application of a given pumping signal, specifically, a square wave having a period of about 15 msec, to the signal line SG4, and is turned off when the pumping signal ceases to be applied. Thus, when no radio wave is being received and the signal line SG1 assumes the low level L, a voltage of 2.5 V is delivered to the supply line Vc2 while 0 V is delivered to the supply line Vcc. When a radio wave is being received and the signal line SG1 assumes the high level H, a voltage of 5 V is delivered to the supply line Vc2 while 5 V is delivered to the supply line Vcc. When the voltage of 5 V is delivered to the supply line Vcc, CPU 40 is activated, and continues to deliver a pumping signal for a given time interval thereafter, thus achieving a self-holding action of the supply lines Vc2 and Vcc to a voltage level of 5 V.

Figure 4A:
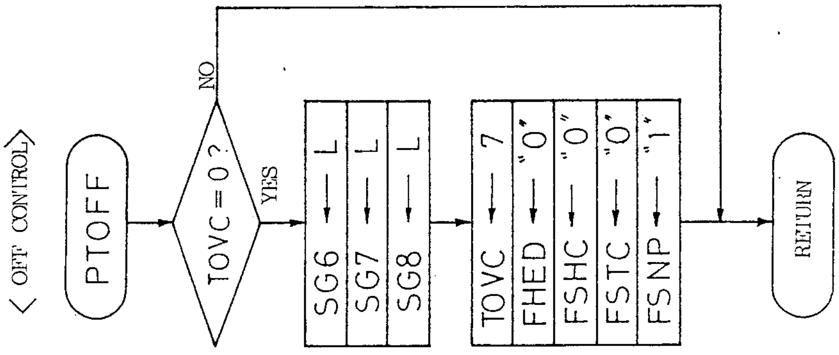
Figure 4B:
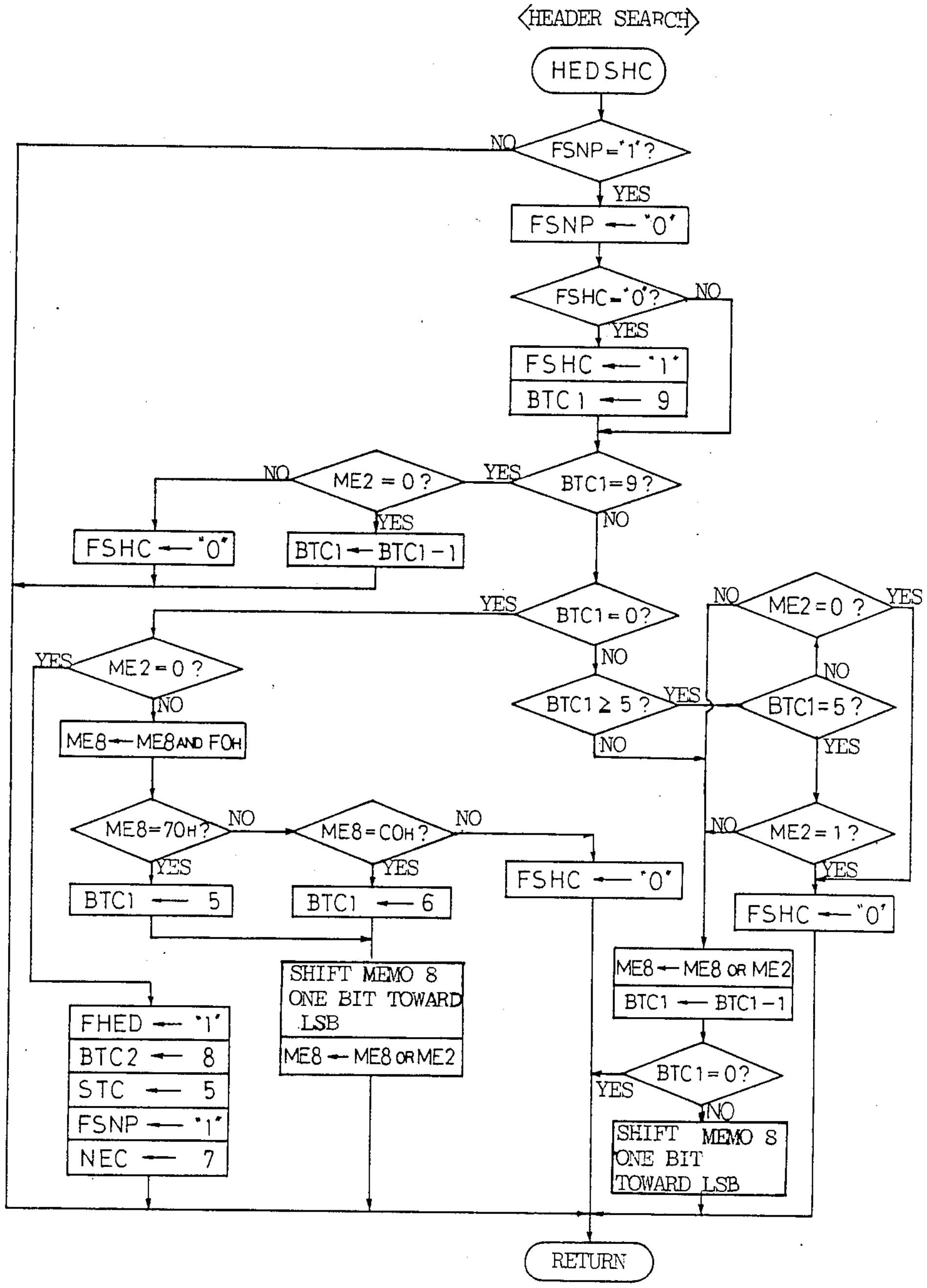
Figure 4C:
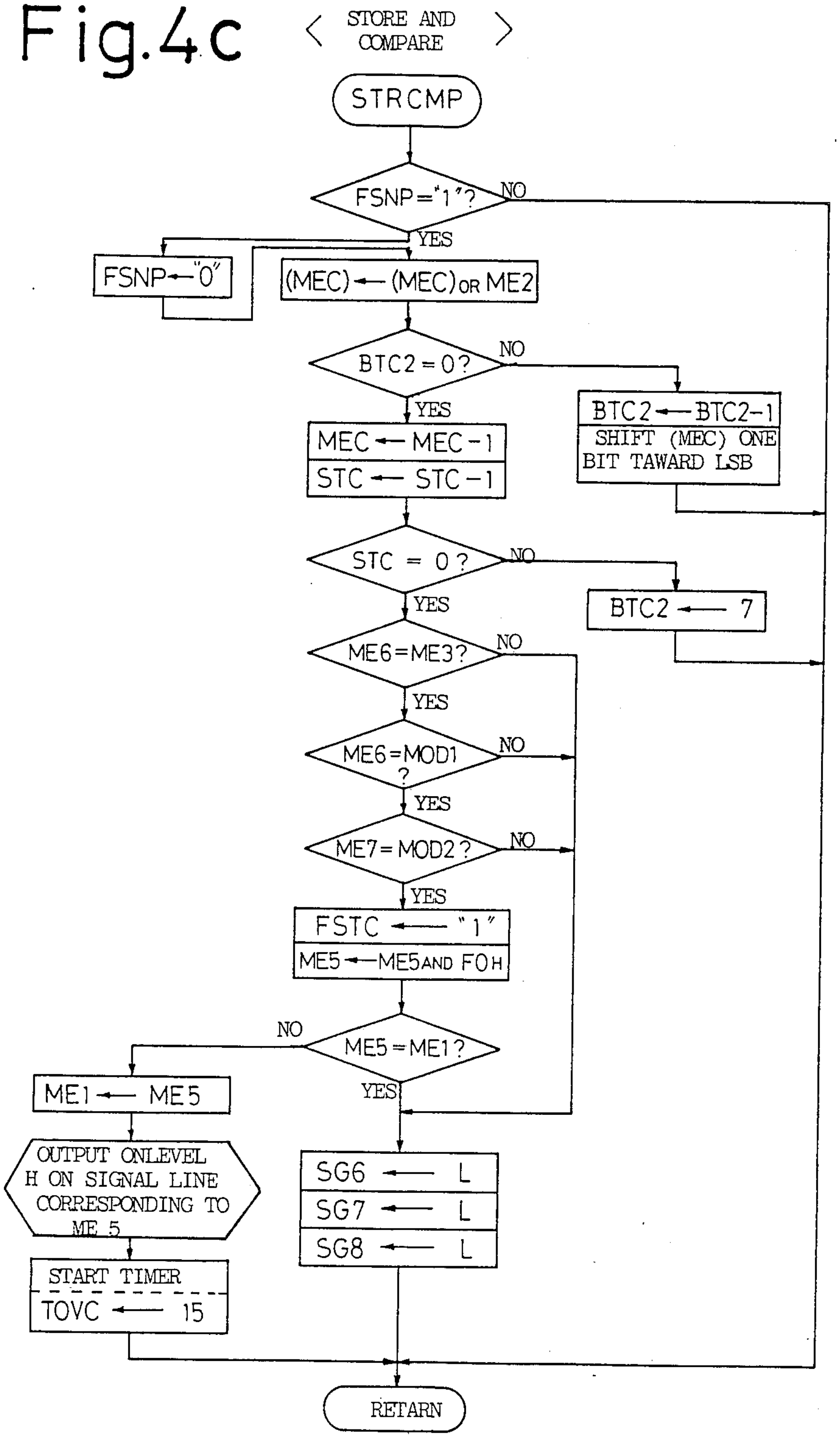
Figure 4D:
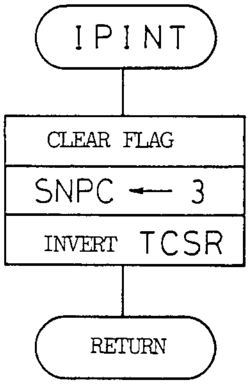
Figure 4E:
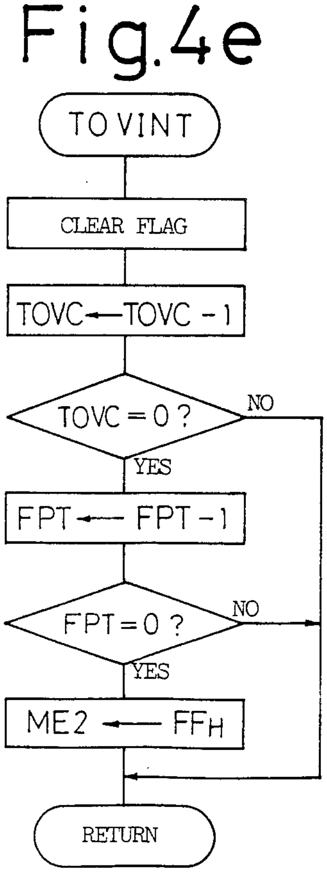
Figure 4F:
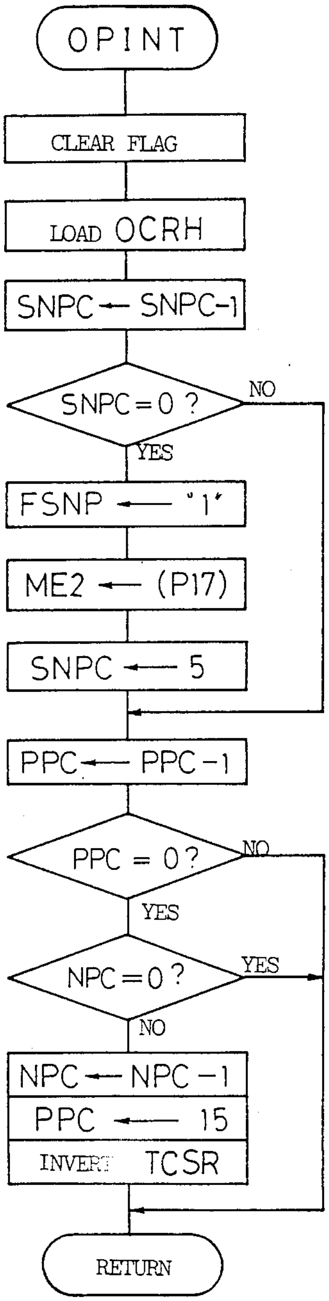

FIG. 3 and FIGS. 4*a*, 4*b*, 4*c*, 4*d*, 4*e* and 4*f* illustrate the operation of CPU 40 shown in FIG. 1. FIG. 3 represents a main routine while FIGS. 4*a*, 4*b* and 4*c* represent subroutines and FIGS. 4*d*, 4*e* and 4*f* represent interrupt service routines. It is to be noted that CPU 40 used herein is a model 68 P01 S0 manufactured by Motorola Co.

Before describing the operation in detail, conditions for an interrupt will be described. In the example given here, there are three causes for an interrupt operation. One is that produced by a rising or falling edge of a signal applied to the port P20. Specifically, there occurs an interrupt request when a first bit of a register TCSR which is internally contained in CPU 40 coincides with the level at the port P20. In response to the interrupt request, a routine "IPINT" shown in FIG. 4*d* is executed. A second occurs when a count of a free running counter which is internally provided within CPU 40 coincides with a preset value in a register OCRH (output compare). The free running counter counts clock pulses which represents the internal clock pulse of CPU 40 divided by four. In response to the interrupt request, a routine "OPINT" shown in FIG. 4*f* is executed. A third interrupt occurs in response to an overflow from a free running counter which is internally provided within CPU. In response to the overflow interrupt request, a routine "TOVINT" shown in FIG. 4*e* is executed.

Nomenclature assigned to memories or the like which are used in the routines shown in FIG. 3 and FIGS. 4*a*, 4*b*, 4*c*, 4*d*, 4*e* and 4*f* will be described below.

BTC1 . . . A counter which indicates the number of bits in data which is to be stored in a memory during a header search routine "HEDSHC".

BTC2 . . . A counter which indicates the number of bits in data which is to be stored in a memory during a store and compare routine "STRCMP".

FHED . . . A header search flag which is normally "0" and assumes "1" when the header is recognized.

FPT . . . A flag which switches a timer that is used to clear ME1.

FSHC . . . An initialization flag which assumes "1" upon completion of an initialization in a header search routine.

FSNP . . . An input sampling flag which assumes "1" upon completion of a sampling operation.

FSTC . . . A store and compare flag which normally assumes "0" and which assumes "1" whenever the identification code in the data received coincides with the identification code of the reciever.

MEC . . . 16 bit counter which holds the address of a memory where data is to be stored.

ME1 . . . A memory which stores an immediately preceding control code.

ME2 . . . A memory for temporary storage of sampled data.

ME3 . . . A memory which stores the most significant eight bits of the identification code from a data train which is received for the second time.

ME4 . . . A memory which stores the least significant eight bits of the identification code from a data train which is received for the second time.

ME5 . . . A memory which stores the control code and the header information from a data train which is received for the second time.

ME6 . . . A memory which stores the most significant eight bits of the identification code from a data train which is received for the first time.

ME7 . . . A memory which stores the least significant eight bits of the identification code from a data train which is received for the first time.

ME8 . . . A memory which stores the control code and the header information from a data train which is received for the first time.

MOD1 . . . A memory which stores the most significant eight bits of the identifidation code which is established for the receiver.

MOD2 . . . A memory which stores the least significant eight bits of the identification code which is established for the receiver.

NPC . . . A pumping output control counter which assumes a count of 255 initially and which counts down to zero when a given time interval has passed. The zero count in this counter causes the pumping signal to cease to be delivered.

PPC . . . A pumping counter which repeatedly counts down from 15 to 0 upon each entry into the routine "OPINT". The status of the pumping signal is inverted each time the counter reaches a count of 0.

SNPC . . . A sampling pulse counter which counts down from 5 to 1 upon each entry into the routine "OPINT". Data is sampled when the count in the counter changes from 1 to 5, and thus the counter is utilized to control the timing which corresponds to the center of each data bit. When data level which is to be sampled changes, the counter is preset to 3.

SPC . . . A counter which indicates the number of bytes in data which is to be stored in a memory during the store and compare routine.

TOVC . . . A counter which function as a software timer and which counts the number of times an overflow from a hardware timer has occurred.

Initially referring to FIG. 3 for describing the operation by CPU 40, when the power supply is turned on, namely, when a radio wave is received and the power supply unit 20 delivers a voltage of 5 V to the supply line Vcc, CPU 40 initially performs an initialization step. It then reads the status of the switch matrix 50, and forms ID code (identification code) of itself. It is to be noted that memories within CPU 40 are in unit of 8 bits. Since ID code comprises 16 bits, the most significant eight bits of ID code is stored in MOD1 while the least significant eight bits are stored in MOD2. It then loads FFh in hexadeciaml notation and corresponding to 255 in decimal notation into a counter NPC.

The subsequent processing operation takes place in a loop fashion. Since the flag FHED is "0" initially, the header search subroutine "HEDSHC" is executed. Data being received is checked, and the subroutine "HEDSHC" is executed repeatedly until the header is detected, whereupon the flag FHED is set to "1".

When the flag FHED is set to "1", a flag FSTC is then checked. The flag FSTC is "0" initially, and hence the store and compare subroutine "STRCMP" is executed. As the subroutine "STRCMP" is executed repeatedly and it is found that the identification code of the receiver coincides with the identification code contained in the data being received, the flag FSTC is set to "1". Thereupon, a control instructed by the data being received, namely, the energization of the unlock controlling solenoids SL1, SL2 or SL3 is performed. When the flag FSTC is set to "1", an off control subroutine "PTOFF" is executed. The subroutine "PTOFF" is executed repeatedly until a given time interval passes since the energization of solenoid SL1, SL2 or SL3 is commanded. When such time interval has passed, the solenoid which has been commanded to be energized is commanded to be reenergized, clearing flags FHED and FSTC to "0". Accordingly, the execution of the header search subroutine "HEDSHC" is resumed, repeating the described operation. However, when a given time interval has passed and the data ceases to be received, the pumping signal ceases to be delivered, thus turning the power supply (Vcc) for CPU 40. Simultaneously, the power supply (Vc2) for the receiver unit is changed to the lower voltage level.

Figure 8B:
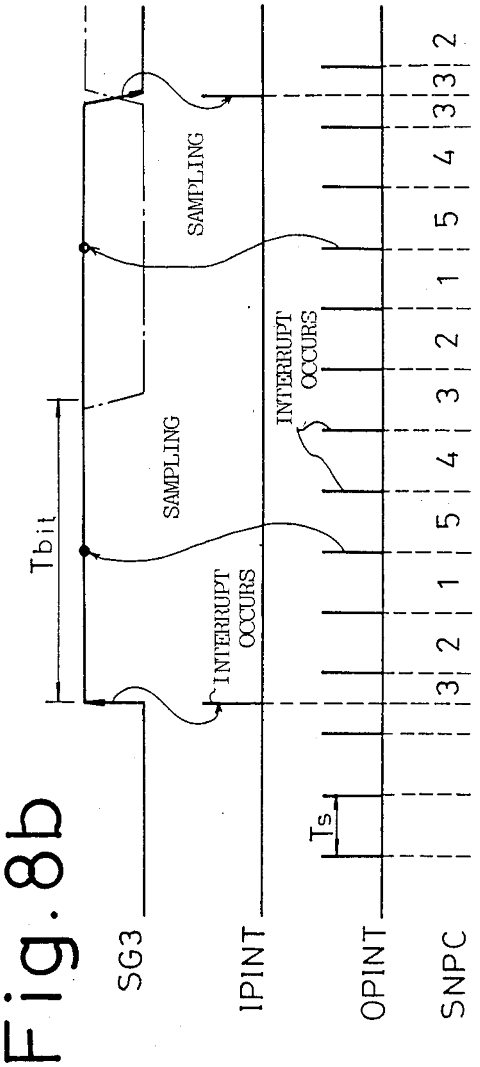

An interrupt operation will now be described. During the initial condition, the first bit of the register TCSR is set to "1", and hence when a rising edge from the L to the H level is detected on the signal line SG3, an interrupt request is developed, thus executing the routine "IPINT" (FIG. 4*d*). As indicated in FIG. 8*b*, an interrupt which causes the execution of the routine "OPINT" (FIG. 4*f*) occurs periodically with a given period of Ts, which is specifically equal to 522 μsec. The period Ts corresponds to one-fifth the bit time Tbit of data being received. An overflow interrupt which causes the execution of the routine "TOVINT" (FIG. 4*e*) occurs every 65.5 msec.

Referring to FIG. 4*d*, upon entry into the routine "IPINT", the flag is cleared, and 3 is loaded into the counter SNPC, and the content of the first bit in the register TCSR is inverted. Accordingly, as shown in FIG. 8*b*, it is assured that the counter SNPC be preset to 3 upon detection of an edge on the signal line SG3. Concurrently, the next condition for the detection of the edge is changed from the rising edge to the falling edge.

Referring to FIG. 4*f*, upon entry into the routine "OPINT", the flag is initially cleared, and a given value is loaded into the register OCRH which determines the next interrupt time of itself. In the example shown, a value is preset which provides an interrupt period of 522 μsec. The counter SNPC is decremented by 1. The counter SNPC has an initial value of 5, and thus is decremented to 5, 4, 3, 2 and so on for each execution of the routine "OPINT" or every 522 μsec.

When the counter SNPC has a count of 0, the level at the input port P17 is read and is stored in the memory ME2. The counter SNPC is preset to the initial value of 5 again. However, since the count in the counter SNPC is forcedly altered to 3 during the interrupt service routine "IPINT", it assumes a value which is synchronized with the timing when a change in the level of data appearing on the signal line SG3 is detected.

Since the level (port P17) on the signal line SG3 is sampled when the count in the counter SNTC is equal to 0, loading the fixed value 3 into the counter upon detecting the changing edge in the data level allows the data level to be sampled at a timing which corresponds to the center of the data bit, as indicated in FIG. 8*b*.

The counter PPC is then decremented by 1. When the count in the counter PPC is equal to 0, the counter NPC is decremented by 1 unless its count is equal to 0, again loading 15 into the counter PPC and inverting the content of a given bit in the register TCSR. This bit is delivered on an output port P13 of CPU 40, which represents the pumping signal. Accordingly, the level "H/L" of the pumping signal is inverted for each entry into the routine "OPINT" which occurs fifteen times, or every 7.83 msec.

Referring to FIG. 4*e*, upon entry into the routine "TOVINT", the flag is cleared and the counter TOVC is decremented by 1. When the count in the counter TOVC is equal to 0, the flag FPT is decremented by 1. If the flag FPT is equal to 0, FFh (corresponding to decimal number 255) is loaded into the memory ME2.

Referring now to FIG. 4*b*, the header search subroutine "HEDSHC" will be described. Initially a flag FSNP is checked. During the initial phase, the flag FSNP is equal to "0", and nothing takes place. When the sampling of the signal line SG3 is executed during the interrupt routine "OPINT", the flag FSNP is set to "1", and when the flag FSNP is set to "1", it is cleared to "0" before proceeding to a subsequent processing operation. The flag FSHC is then checked. Since this flag is equal to "0" during the initial phase, the flag is initially set to "1", and 9 is loaded into the counter BTC1.

The count in the counter BTC1 is then examined to effect a processing operation which depends on the count. As mentioned previously, the counter BTC1 has an initial count of 9, which requires a checking operation for the memory ME2. The purpose of this operation is to confirm if the bit which precedes the header (thus, bit 0 shown in FIG. 8*a*) is at an L level (corresponding to "0"). If the memory ME2 has "0", this represents a normal condition, and hence the counter BTC1 is decremented by 1. Otherwise, the flag FSHC is cleared to "0".

When the counter BTC1 is decremented by 1 and the count thereof is equal to 8, the memory ME8 is checked during the next processing operation to see if it is at its H level corresponding to "1". The purpose of this operation is to confirm whether the first bit of the header assumes the given level or H level. When ME2 is found not equal to "1", an error is declared, clearing the flag FSHC to "0". If the memory ME2 is equal to "1", a logical sum of the contents of the memories ME2 and ME8 is formed, with the sum stored in the memory ME8. The counter BTC1 is decremented by 1, and unless the resulting count is equal to "0", the content in the memery ME8 is shifted by one bit toward the least significant bit. Thus the most significant bit of the memory ME2 has the latest level at the port P17 or the latest value of data bit, and thus it is loaded into the most significant bit of the memory ME8, thus shifting the bit positions in preparation to the reception of the next data bit.

A similar processing operation takes place for a count in the counter BTC1 which is equal to 7 and 6, respectively, as when the counter has a count of 8. This examines whether the high level H occur consecutively for three bits.

When the count in the counter BTC1 is equal to 5, the memory ME2 is checked, and if it is equal to "0", it is determined that this represents the final or fourth bit of the header, and a logical sum of the contents of the memories ME2 and ME8 is formed, with the sum stored in the memory ME8. The counter BTC1 is decremented by 1, and unless the resulting count is equal to 0, the content in the memory ME8 is shifted by one bit toward the least significant bit.

When the counter BTC1 has a count of 4, 3, 2 or 1, the content of the memory ME2 is not checked, but a logical sum of the contents of the memories ME2 and ME8 is directly formed, with the sum stored in the memory ME8. The counter BTC1 is decremented by 1, and if the resulting count is not equal to 0, the content in the memory ME8 is shifted by one bit toward the least significant bit. When the count in the counter BTC1 is equal to 0, the content of the memory ME2 is checked, to see if the first bit or bit 9 in the identification code has an L level. An error is declared if the bit is not at an L level.

In the event an error is found, eight bits which have been received up to that point, namely, the first to the eighth bit, which are stored in the memory ME8 in parallel form, are examined. In this instance, data which has been initially recognized as a header is in error, and hence a logical product of the content of the memory ME8 and F0h (decimal number 240) is formed, neglecting the data which has previously been recognized as a header (the least significant four bits). If the product is equal to 70h (decimal number 102), it is possible that the most significant four bits may represent the first to the fourth bit of the received data or the header. In this instance, 5 is loaded into the counter BTC1, and the memory ME8 is shifted by one bit before a logical sum of the contents of the memories ME2 and ME8 is formed.

If the memory ME8 is equal to C0h (decimal number 192), it is possible that the most significant four bits may comprise bit 0, bit 1 and bit 2 of the received data. In this instance, 6 is loaded into the counter BTC1 and the memory ME8 is shifted by one bit before forming a logical sum of the memories ME2 and ME8.

When the memory ME8 is neither equal to 70h nor C0h, the flag FSHC is cleared to "0", and the header search is started from the beginning again. If the content of the memory ME2 is at L level when the counter BTC1 has a count of 0, it is determined that the header search has been completed, thus setting the flag FHED to "1", setting the counter BTC2 to 8, setting the counter STC to 5, setting the flag FSNP to "1" and setting the counter MEC to 7. This sets the flag FHED to "1". The store and compare subroutine will now be described.

Referring to FIG. 4c, the store and compare subroutine STRCMP will now be described. The flag FSNP is initially checked. As mentioned previously, the flag FSNP is normally equal to "0", but is set to "1" if a sampling of the signal line SG3 takes place during the interrupt routine "OPINT". In the event the flag FSNP is set to "1", it is cleared to "0" before proceeding to the subsequent processing operation.

In the subsequent description, it is to be understood that any designation which is contained within parentheses represents a memory, the address of which is indicated by the content of a particular memory which is expressed by the designation. A logical sum of the content of a memory, the address of which is indicated by the counter NEC, and the content of the memory ME2 is formed, with a resulting sum stored in a memory, the address of which is indicated by the counter MEC. It is to be understood that the memories MME1, ME2, ME3, ME4, ME5, ME6, ME7 and ME8 mentioned above have consecutive addresses, and the counter MEC indicates the address of the memory ME7 immediately upon completion of the header search. Thus, at such time, received data is stored in the memory ME7.

When data corresponding to one bit is stored, the bit counter BTC2 is decremented by 1, and the content of a memory which is indicated by the counter MEC is shifted by one bit toward the least significant bit in preparation to the next data bit. Such operation is repeated until the count in the bit counter BTC2 becomes equal to 0. In other words, each data bit is repeatedly stored until a complete set of eight data bits is stored in the memory which is indicated by the counter MEC.

When the bit counter BTC2 has a count of 0, the counter MEC is decremented by 1, thus updating the memory in in which data is to be stored. The counter STC is then decremented by 1, and unless the resulting count is not equal to 0, 7 is loaded into the bit counter BTC2, thus repeating the storage of received data. Since the counter STC is preset to 5 upon completion of the header search, eight data bits are sequentially stored in the memories ME7, ME6, ME5, ME4 and ME3. If data is properly received, the individual memories contain data, as indicated below, at the time the count in the counter STC is equal to 0.

ME8: The control code and header information from a data train which is received for the first time.

ME7: The least significant eight bits of the identification code from a data train which is received for the first time.

ME6: The most significant eight bits of the identification code from a data train which is received for the first time.

ME5: The control code and header information from a data train which is received for the second time.

ME4: The least significant eight bits of the identification code from a data train which is received for the second time.

ME3: The most significant eight bits of the identification code from a data train which is received for the second time.

In other words, two sets of data (48 bits) are received and stored before proceeding to the subsequent operation.

Upon completion of the described processing operation, it is examined if the identification code contained in the data which is received for the first time coincides with the identification code contained in the data which is received for the second time. If they do not match, signal lines SG6, SG7 and SG8 are brought to the low level L, and the deenergization of the solenoids SL1, SL2 and SL3 are commanded.

When the both identification codes match, the identification code received (the content of ME6 and ME7) is compared with the identification code of the receiver itself (the content of MOD1 and MOD2). If they do not match, the signal lines SG6, SG7 and SG8 are brought to the low level L, and the deenergization of the solenoids SL1, SL2 and SL3 is commanded.

If the identification code contained in the data received, for the first time and for the second time match, and the identification code contained in the received data matches the identification code of the receiver, the flag FSTC is set to "1". In order to neglect unnecessary header information, a logical product of the content of the memory ME5 and the fixed value F0h (decimal value 240) is formed, with the result stored in the memory ME5. This leaves only the control code in the memory ME5.

The memory ME1 has the previous control code stored therein. Accordinglly, the content of the memory ME5 is compared against the content of the memory ME1, and if they do not match, or thus if there has been a change in the control code, the content of the memory ME5 is transferred to the memory ME1, and the signal line (either SG6, SG7 or SG8) which corresponds to the content of the memory ME5 is brought to the high level H, commanding the energization of a selected solenoid. A fixed value of 15 is loaded into the counter TOVC which represents a software timer. If the content of the memory ME5 is equal to the content of the memory ME1, the signal lines SG6, SG7 and SG8 are brought to the low level L. When the flag FSTC is set to "1", the execution of the store and compare routine "STRCMP" is completed, and the operation then proceeds to the off control subroutine "PTOFF".

Referring to FIG. 4*a*, the off control subroutine "PTOFF" will now be described. The purpose of the subroutine is to turn the solenoid off which has been commanded to be energized, upon the software timer counting a given time interval. In other words, the subroutine controls the duration of energization of the solenoid. The counter TOVC is preset to 15 at the time a command is issued to energize the solenoid, and is decremented for each execution of a timer interrupt routine TOVINT or every 65.5 msec. Thus, in the present example, the counter TOVC reaches a count of 0 when about one second passes since the command to energize the solenoid has been issued. When the counter TOVC becomes equal to 0, the low level L is established at the signal lines SG6, SG7 and SG8 and 7 is loaded into the counter TOVC, and flags FHED, FSHC, FSTC and FSNP are set to "0", "0", "0" and "1", respectively.

The pumping signal will be described in more detail. The pumping signal is produced each time the counter PPC reaches a count of 0 or every 7.83 msec during the interrupt routine OPINT shown in FIG. 4*f*, by inverting the level thereof. However, when the counter NPC reaches a count of 0, such processing is skipped over. Specifically, when the counter NPC is equal to 0, the pumping signal ceases to be produced, and the power supply is turned off unless any radio wave is being received. In the main routine shown in FIG. 3, the counter NPC is initialized to 255, and is decremented by one each time the counter PPC reaches a count of 0 or every 7.83 msec. Accordingly, the length of time that the power supply for CPU 40 is turned on upon receiving a radio wave for the first time until the power supply is turned off is about 2 seconds.

The transmitter for the electronic lock system or a portable unlock operating board will be described, the electrical circuit of the board being shown in FIG. 5. Referring to FIG. 5, the operating board comprises an identification code generating circuit 100, a microcomputer (hereafter referred to as CPU) 110, a power supply circuit 120, a modulator circuit 130 and a high frequency amplifier circuit 140. Switches SW1, SW2 and SW3 are employed to provide unlock commands to mechanisms associated with a right-hand door lock, a left-hand door lock and a trunk lock, respectively.

The identification code generating circuit 100 comprises a number of resistors which provide predetermined binary levels to input ports R0 to R15 of CPU 110. When reading the status at these ports, CPU 110 generates a 16 bit identification code which is to be transmitted from the transmitter. CPU 110 comprises a 4-bit parallel processing, single chip microcomputer, commercially available as the model MB8855 from Fujitsu Co.

The power supply circuit 120 includes an input line which is connected to a battery BT2. In operation, a transistor Q7 is normally turned off, whereby the voltage on an output line Vcc is 0. However, when a base potential of the low level L is applied to the transistor Q7, the latter is turned on, whereupon a voltage of about 5 V is supplied to the supply line Vcc. The transistor Q7 is turned on in the following manner:

When the switch SW1 is turned on, the signal line SG9 is connected to the supply line Vcc through a resistor R44, and thus assumes the low level L. Similarly, when the switch SW2 is turned on, the signal line SG10 assumes the low level L, and the signal line SG11 assumes the low level L when the switch SW3 is turned on. When at least one of the signal lines SG9, SG10 and SG11 assumes the low level, there occurs a current flow from the base of the transistor Q7 to that signal line, thus causing the base to assume a potential of the low level L, thereby turning the transistor Q7 on. A transistor Q5 is normally off as is a transistor Q6. However, when the pumping signal is applied to the signal line SG13, the transistor Q5 is turned on as is the transistor Q6. When the transistor Q6 is turned on, its collector potential assumes the low level L, whereby the base potential of the transistor Q7 assumes the low level L, thus turning the transistor Q7 on.

In this manner, when either-one of the switches SW1, SW2 and SW3 is turned on, the power supply of the apparatus is turned on, feeding a voltage of 5 V to CPU 110, the modulator circuit 130 and the high frequency amplifier circuit 140 for operation thereof. As the power supply is turned on, CPU 110 delivers a pumping signal on the signal line SG13, thus performing a self-holding action which maintains the power supply on.

The modulator circuit 130 delivers a high frequency signal having a frequency which depends on the signal level appearing on a signal line SG14. As will be described later, a serial binary signal corresponding to data to be transmitted is applied to the signal line SG14. Accordingly, there appears a high frequency signal having a frequency which alternates between two frequencies at the output of the modulator circuit 130.

The high frequency amplifier 140 amplifies the high frequency signal delivered by the modulator 130 and applies it to a transmitting antenna ANT for radiating it as a radio wave.

FIGS. 6*a*, 6*b*, 6*c*, 6*d*, 6*e* and 6*f* and FIGS. 7*a*, 7*b*, 7*c*, 7*d*, 7*e*, 7*f*, 7*g* and 7*h* illustrate the operation of CPU 110 shown in FIG. 5. FIGS. *6a*, *6b*, *6c* and *6d* represent a main routine and FIGS. *6e* and *6f* illustrate timer interrupt service routines. FIGS. *7a* to *7h* indicate individual subroutines, illustrating the detail of the operation. Before describing the operation of CPU 110, memories, registers and flags appearing in various Figures will be described. A memory map within CPU 110 is shown in the Table 1 below.

TABLE 1

| y = | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | | | | | | | | X = 0: | | | | | | | | |
| bit | | | | | | | | | | | header | | | | | |
| 3 | (AC) | (X) | FS3 | AOH | (Y) | (YTI) | Pout | OH | FTII | NTC | (L) | S3 | B3 | B7 | B11 | B15 |
| 2 | | | FS2 | | | | | out | FTIO | | (H) | S2 | B2 | B6 | B10 | B14 |
| 1 | | | FS1 | | | | | | FTIM | | (H) | S1 | B1 | B5 | B9 | B13 |
| 0 | | | FS0 | | | | | | FTIC | | (H) | S0 | B0 | B4 | B8 | B12 |
| | | | | | | | | X = 1: | | | | | | | | |
| bit | | | | | | | | | | | | | | | | |
| 3 | TC1 | TC2 | TC3 | NK | NS | SS | FNR3 | NR0 | NR1 | NR2 | NR3 | TS3 | TB3 | TB7 | TB11 | TB15 |
| 2 | | | | | | | FNR2 | | | | | TS2 | TB2 | TB6 | TB10 | TB14 |
| 1 | | | | | | | FNR1 | | | | | TS1 | TB1 | TB5 | TB9 | TB13 |
| 0 | | | | | | | FNR0 | | | | | TS0 | TB0 | TB4 | TB8 | TB12 |
| | | | | | | | | X = 2: | | | | | | | | |
| bit | | | | | | | | | | | | | | | | |
| 3 | NP0 | NPS | NT0 | FSS3 | | | | | | | | | | | | |
| 2 | | | | FSS2 | | | | | | | | | | | | |
| 1 | | | | FSS1 | | | | | | | | | | | | |
| 0 | | | | FSS0 | | | | | | | | | | | | |

In the table 1, a Y address of a memory is indicated along the row while an X address is indicated along the column. In the description to follow, a memory address is specified as by M(Nx, Ny), where Nx represents the X address and Ny the Y address.

Flags used will be described below.

FS0, FS1 . . . Data bit select flags which indicate the number of a bit when outputting the content of an output data register M(0, 10) to M(0, 15).

FS2 . . . Data entry complete flag which assumes "0" when an entry is incomplete and assumes "1" when an entry of all data is complete.

FS3 . . . Preheader forming modulation control flag which masks and enables a modulating operation when it assumes "0" and "1", respectively. This flag initially assumes "0", and is set to "1" after the flag FS2 is set to "1".

FTIC . . . Switch data transfer enable flag which inhibits and enables a transfer when it assumes "0" and "1", respectively. The flag is set to "1" after completing eight output operations of a same data.

FTIM . . . Switch mode transfer recognition flag which assumes "0" before the transfer and assumes "1" after the transfer. After transferring the switch mode, the flag is set "1".

FTIO . . . Cut-off timer flag which normally assumes "0", and is set to "1" by a timer interrupt routine with a period of about 2.6 msec. After it has been set to "1", it is cleared to "0" in the main routine while simultaneously incrementing the software timer by one.

FTII . . . Switch entry flag which normally assumes "0", but which is set to "1" when an on condition of the switch is detected. It is to be noted that a plurality of switch on conditions are prevented from being detected simultaneously.

FNR0 . . . Identification code entry flag which initially assumes "0" and is set to "1" upon completion of the entry of the least significant four bits of the identification code.

FNR1 . . . Identification code entry flag which initially assumes "0" and is set to "1" upon completion of the entry of bits 4 to 7 of the identification code.

FNR2 . . . Identification code entry flag which initially assumes "0" and is set to "1" upon completion of the entry of bits 8 to 11 of the identification code.

FNR3 . . . Identification coe entry flag which initially assumes "0" and is set to "1" upon completion of the entry of bits 12 to 15 of the identification code.

FSS2 . . . Cut-off timer restart flag which initially assumes "0" and is set to "1" when initiating a data transmission for the first time. This flag is utilized to restart the cut-off timer.

Memories will now be described.

A0H . . . A memory which stores data to be delivered to OH port where OH represents output ports O4 to O7.

YT1 . . . Y register address stack.

Pout . . . A memory which stores data to be delivered to P port (P0 to P3).

OHout . . . A buffer which stores data to be delivered to OH port.

SS . . . A memory which stores data read from a switch.

NTC . . . An output data counter which is used to repeat the outputting of a same data eight times.

NK . . . A switch effect conversion of data read from a switch.

NS . . . A switch counter which counts the number of times switch data is repeatedly read until a given number is reached.

NR0 . . . Identification data counter which counts the number of times 4 bits of the identification code which are read through ports R0 to R3 are read until a given number is reached.

NR1 . . . Identification data counter which counts the number of times 4 bits of the identification code which are read through ports R4 to R7 are read until a given number is reached.

NR2 . . . Identification data counter which counts the number of times 4 bits of the identification code which are read through ports R8 to R11 are read until a given number is reached.

NR3 . . . Identification data counter which counts the number of times 4 bits of the identification code which are read through ports R12 to R15 are read until a given number is reached.

NPO . . . Pumping control counter.

NPS . . . Switch entry counter which is used to effect conversion of data read from a switch.

NTO . . . A counter which counts the number of timer interrupts.

TC1, TC2, TC3 . . . Counters which maintain a count of the software timer.

TS0 to TS3, S0 to S3 . . . Buffer memories which store data read from a switch.

TB0 to TB15, B0 to B15 . . . Buffer memories which store 16 bit identification code read through the R ports.

The operation of CPU 110 will now be described. Upon turning the power supply on, an entry is made to "RESET" in the main routine shown in FIG. *6a*. In this example, an interrupt initiated by an internal timer of CPU 110 occurs with a period of about 260 μsec. Upon occurrence of such timer interrupt, a timer interrupt service routine "TINT" shown in FIG. *6e* is entered.

Initially referring to FIGS. *6a* and *6b*, when the power supply is turned on, an interrupt is initially inhibited, every bit at the P port is set to the high level H, an initial level is set up at the O port, all internal memories are cleared, and initial values are loaded into registers.

In the processing operation labelled "READ1", the levels prevailing at ports R0 to R15 are read to generate an identification code of itself. Initially, the levels of the four bits from ports R0 to R3 (which is denoted as RA) are entered and compared against the content of the buffer memories TB0 to TB3. During the initial condition, the buffer memories TB0 to TB3 are cleared to 0, and hence they do not match. When they do not match, data from the ports R0 to R3 are stored in the buffers TB0 to TB3 while clearing the counter NR0 to 0.

In a similar manner, the levels of four bits from ports R4 to R7 (denoted as RB) are entered and compared against the content of the buffer memories TB4 to TB7. During the initial condition, the buffer memories TB4 to TB7 are cleared to 0, and hence they do not match. When they do not match, data from the ports R4 to R7 are stored in the buffers TB4 to TB7 while clearing the counter NR1 to 0.

The levels of four bits from the ports R8 to R11 (denoted as RC) are then entered and compared against the content of the buffer memories TB8 to TB11. During the initial condition, the buffer memories TB8 to TB11 are cleared to 0, and hence they do not match. When they do not match, data from the ports R8 to R11 are stored in the buffers TB8 to TB11 while clearing the counter NR2 to 0.

Finally, the levels of the four bits from ports R12 to R15 (denoted as RD) are entered and compared against the content of the buffer memories TB12 to TB15. During the initial condition, the buffer memories TB12 to TB15 are cleared to 0, and hence they do not match. When they do not match, data from the ports R12 to R15 are stored in the buffers TB12 to TB15 while clearing the counter NR3 to 0.

The flags FNR3, FNR2, FNR1 and FNR0 (=FN) are then examined. Each bit of the flag FN assumes "0" initially, and hence the program returns to the step indicated by the label "READ1".

It is to be understood that a denotation including a train of figures "1" or "0" followed by the letter B, as exemplified by "1111B" represents a binary code having individual bits indicated by the figures which precede "B" in the sequence of the most significant to the least significant bit.

Upon returning to the step indicated by the label "READ1", the levels present at the ports R0 to R3 are read and compared against the content of the buffers TB0 to TB3, in the similar manner as before. A result of a first entry is now present in the buffers TB0 to TB3, and hence the both match unless a failure of reading as may be caused by noises has occurred. When a match is found, the counter NR0 is incremented by one. The levels from the ports R4 to R7 are then read and compared against the content of the buffers TB4 to TB7. The counter NR1 is incremented by one upon finding a match therebetween. Similarly, the levels from the ports R8 to R11 are read and compared against the content of the buffers TB8 to TB11. The counter NR2 is incremented by one upon finding a match therebetween. Finally, the levels from the ports R12 to R15 are read and compared against the content of the buffers TB12 to TB15. The flag FN is then examined again, but since there is no change, the program then returns to the step indicated by the label "READ1". Under normal conditions, the looping operation is repeated five times.

When the step indicated by the label "READ1" is entered for the fifth time, a normal procedure takes place as follows: When the counter NR0 is incremented by one as a result of the data read from the ports R0 to R3 matching the content of the buffers TB0 to TB3, the counter has a count of 5, whereupon the flag NFR0 is set to "1", and the content of the buffers TB0 to TB3 are stored in the buffers B0 to B3 while clearing the counter NR0 to 0.

When the counter NR1 is incremented by one as a result of the data read from the ports R4 to R7 matching the content of the buffers TB4 to TB7, the counter has a count of 5, whereupon the flag NFR1 is set to "1", and the content of the buffers TB4 to TB7 are stored in the buffers B4 to B7 while clearing the counter NR1 to 0.

When the counter NR2 is incremented by one as a result of the data read from the ports R8 to R11 matching the content of the buffers TB8 to TB11, the counter has a count of 5, whereupon the flag NFR2 is set to "1", and the content of the buffers TB8 to TB11 are stored in the buffers B8 to B11 while clearing the counter NR2 to 0.

Finally, when the counter NR3 is incremented by one as a result of the data read from the ports R12 to R15 matching the content of the buffers TB12 to TB15, the counter has a count of 5, whereupon the flag NFR3 is set to "1", and the content of the buffers TB12 to TB15 are stored in the buffers B12 to B15 while clearing the counter NR3 to 0. Since then the flag FN has "1111B", the program does not return to the processing operation indicated by "READ1", but proceeds to the following step. Thus, the described operation is repeated until it is ocnfirmed that the identifidation code read from the ports R0 to R15 represents a same content for five consecutive times.

When the flag FN has the content "1111B", the falg FN is cleared to "0000B", and a fixed value "0111B" is stored in the header register M(0, A) within the memory. A given count is then loaded into the internal timer, the given count corresponding to about 260 μsec. A counting operation by the timer is started. Also a timer interrupt is enabled at this point in time. Subsequently, a timer interrupt occurs after a time length of 260 μsec has passed. As will be described later, when the interrupt routine "TINT" is executed, the given count is again loaded into the timer, and hence the timer interrupt occurs repeatedly with a period of 260 μsec.

Figure 6A:
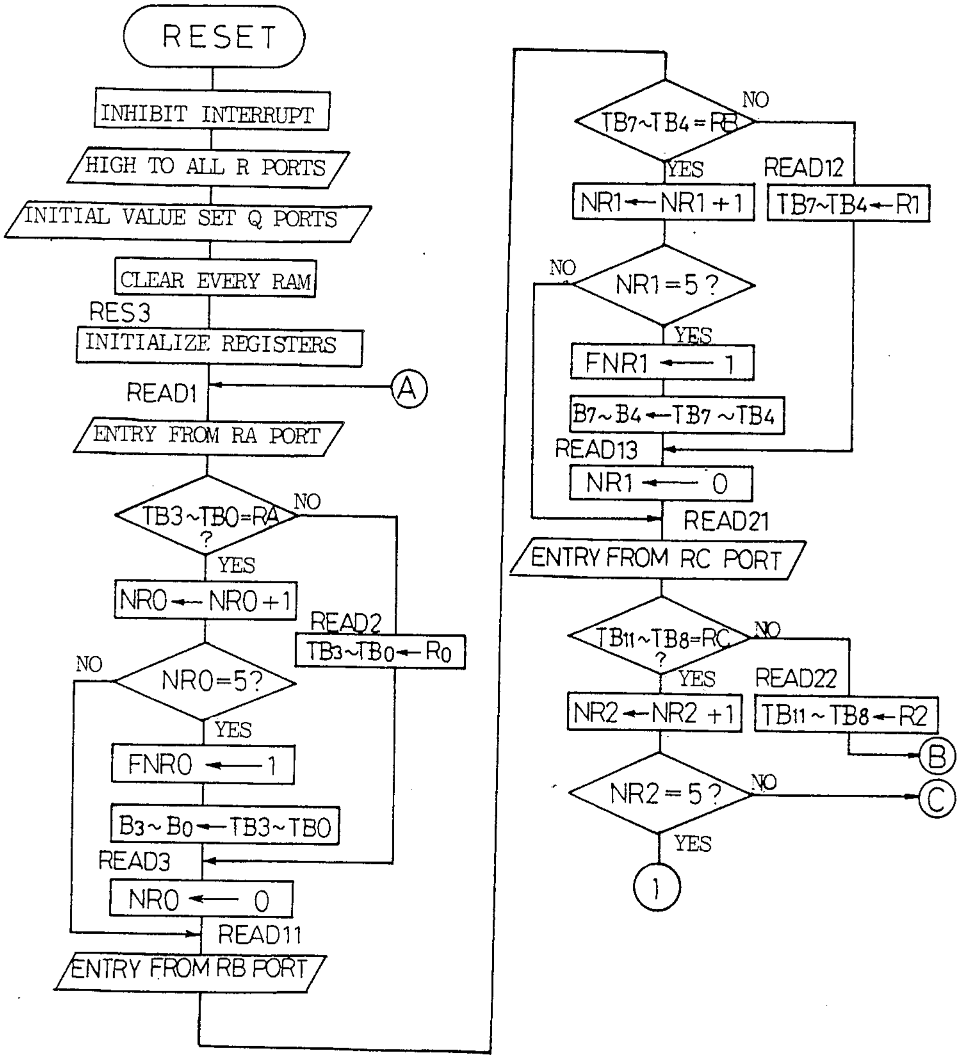
Figure 6B:
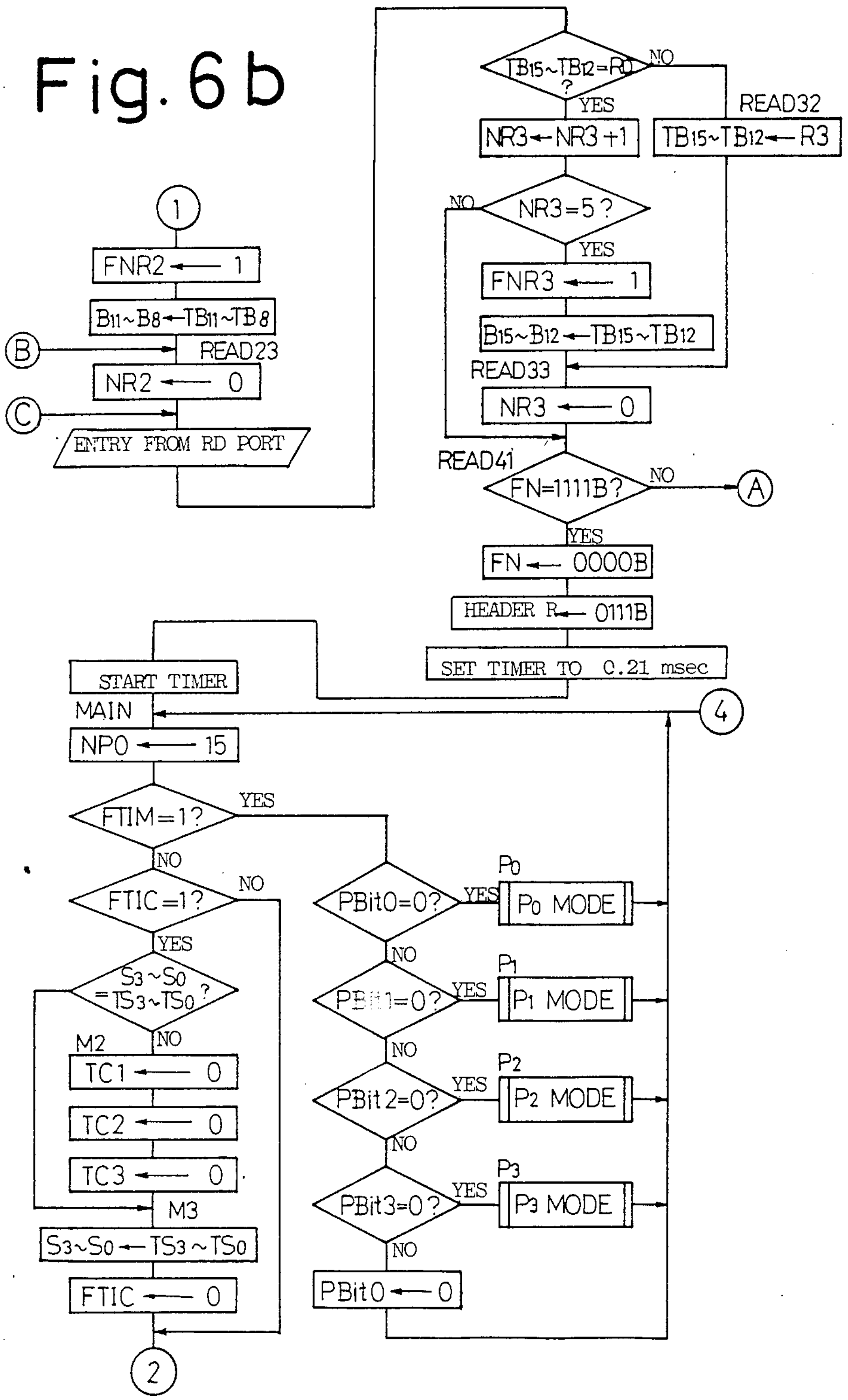
Figure 6C:
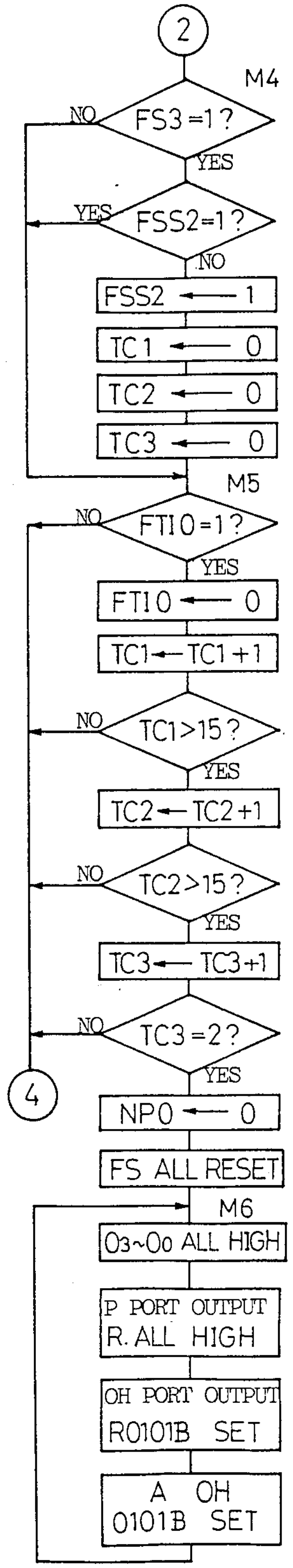
Figure 6D:
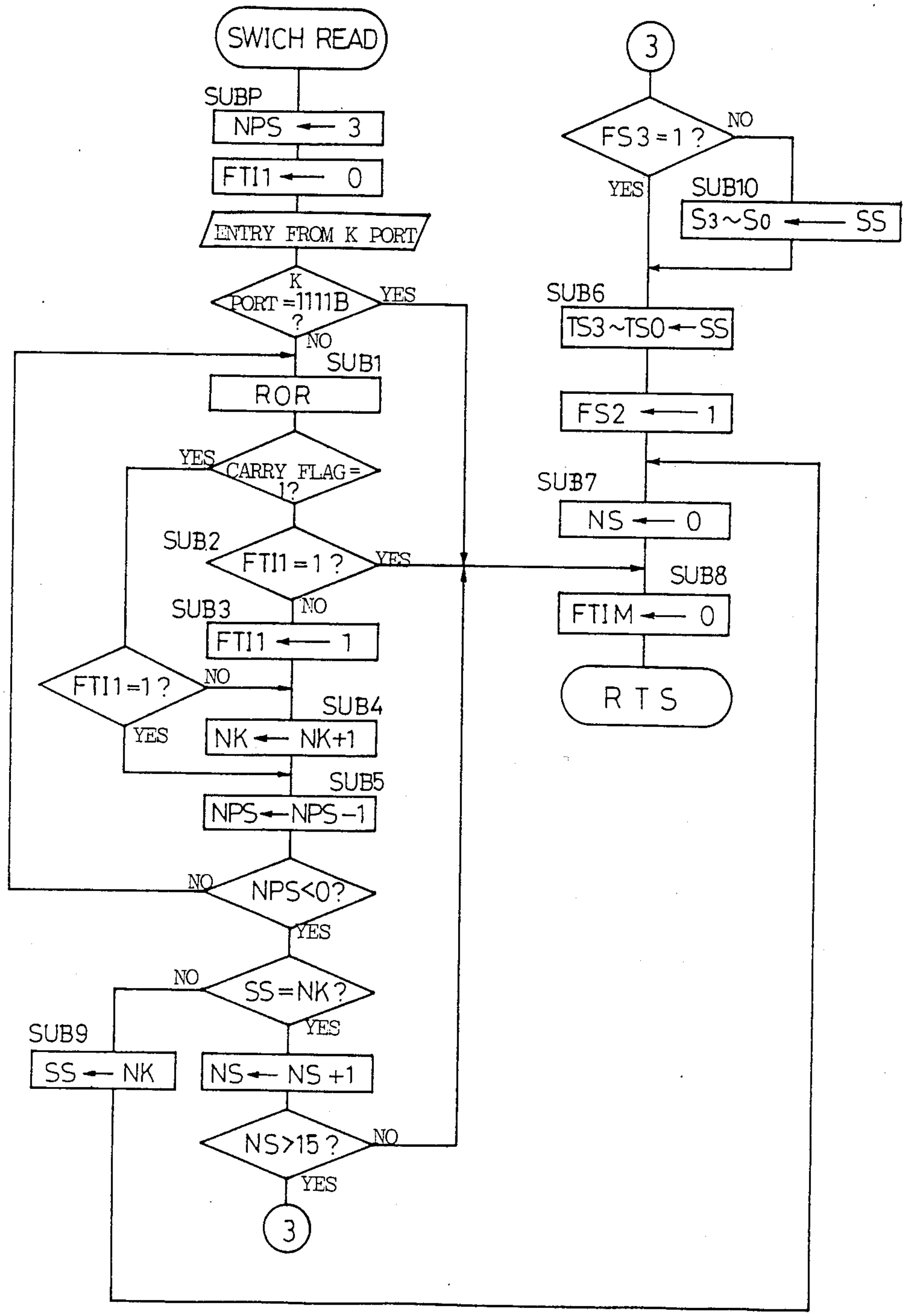
Figure 6E:
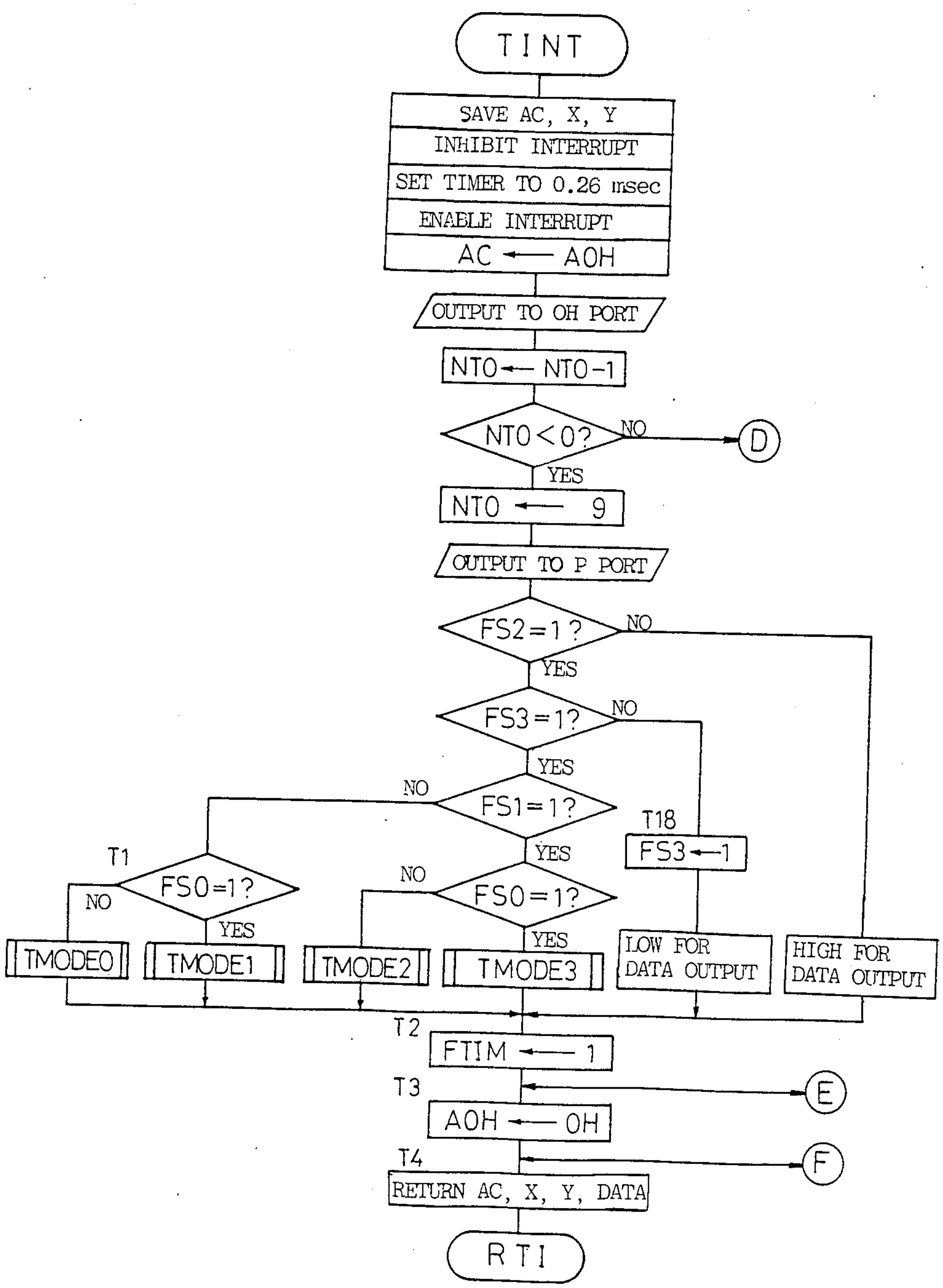
Figure 6F:
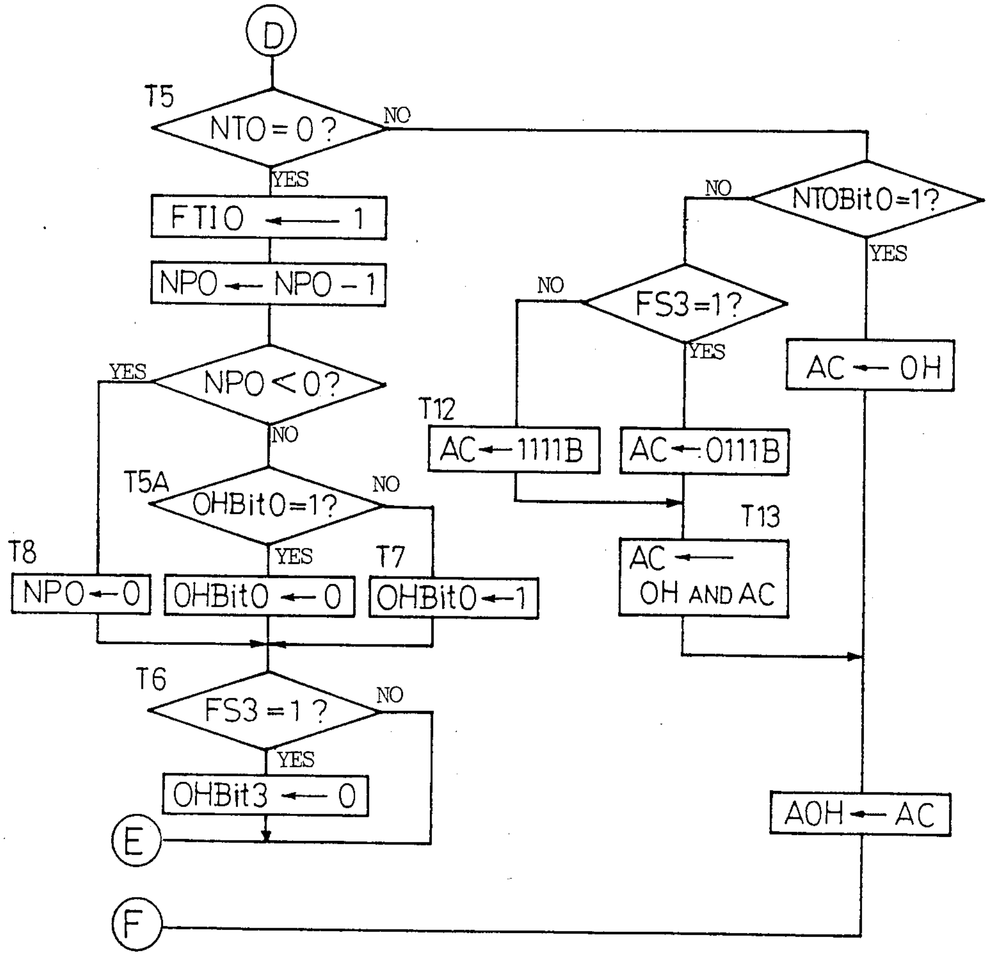

Referring to FIGS. 6e and 6f, a timer interrupt routine will be described. Upon entry into the routine "TINT", internal registers AX, X and Y are saved, and interrupt is inhibited, a given count is again loaded into the timer, an interrupt is then enabled, and the content of the memory A0H is stored in the internal register AC. The content of the memory M(0, 7) is delivered to the OH port. The counter NT0 is decremented by one, and when the resulting count becomes equal to or less than 0, the fixed value 9 is again loaded into the counter, and the content of the memory M(0, 6) is delivered to the P port (P0 to P3). The flag FS2 is then examined. During the initial condition, the flag FS2 assumes "0", and hence the program proceeds to a step labelled "T1A". "1" (corresponding to the high level H of the output port O7) is loaded into the bit 3 of the memory OHout. The flag FTIM is then set to "1", the content of the memory OHout is stored in the memory A0H, and data which have initially been saved from the internal registers AC, X and Y are returned to the respective registers, thus exiting from the interrupt routine. An operation which occurs for a count of the counter NT0 greater than 0 will be described later. The interrupt operation remains unchanged until the flag is changed. This processing operation takes place once for ten interrupt operations, or every 2.6 msec.

Returning to FIG. 6b, the description of the main routine will be continued. When the program proceeds to a step labelled "MAIN", 15 is loaded into the counter NPO, and the flag FTIM is examined. As mentioned previously, the flag FTIM is set to "1", every about 2.6 msec during the interrupt routine "TINT". When the flag FTIM is set to "1", a reference is made to each bit of the memory M(0, 6) which stores the same content as the data which is being delivered to the port P (P0 to P3), and a processing operation dependent on such bits is performed. Specifically, if the bit 0 of the port P is equal to "0", a subroutine "P0MODE" is executed; if the bit 1 of the port P is equal to "0", a subroutine "P1MODE" is executed; if the bit 2 of the port P is equal to "0", a subroutine "P2MODE" is executed; and if the bit 3 of the port P is equal to "0", a subroutine "P3MODE" is executed.

A reference is now made to FIGS. 7e, 7f, 7g and 7h. In a subroutine "P0MODE", 15 is loaded into the counter NK, a subroutine "SWITCH READ" is executed, and "1101B" is stored in the memory M(0, 6) which is allocated to store data to be delivered to the P port. In the subroutine "P1MODE", 3 is loaded into the counter NK, the subroutine "SWITCH READ" is executed, and "1011B" is stored in the memory M(0, 6). In the subroutine "P2MODE", 7 is loaded into the counter NK, the subroutine "SWITCH READ" is executed, and "0111B" is stored in the memory M(0, 6). In the subroutine "P3MODE", 11 is loaded into the counter NK, the subroutine "SWITCH READ" is executed, and "1110B" is stored in the memory M(0, 6). In this embodiment, the output ports P1, P2 and P3 as well as the input port K1 of CPU 110 are connected with no elements, but in the flowcharts, it is assumed that 16 switches are connected to these four bits of the P port and four bits of K port in a matrix form in order to read the switch status. Accordingly, by providing additional switches, a maximum of 16 control signals can be generated.

Initially "1110B" is delivered to the port P. Thus, only the port P0 assumes the low level L. Accordingly, if the switch SW1 is turned on at this time, this condition is transmitted through the transistor Q1 to cause the input port K0 to assume the low level L. If the switch SW2 is turned on, this is transmitted through the transistor Q2 to cause the input port K1 to assume the low level. If the switch SW3 is turned on, this is transmitted through the transistor Q3 to cause the input port K2 to assume the low level. Accordingly, if the switch SW1 is turned on, for example, a reading of the status of the K port (K3, K2, K1 and K0) when the output P0 assumes the low level L results in "1110B" being obtained. "0" of the bit 0 indicates the on condition of the switch SW1.

Referring to FIG. 6d which illustrates the subroutine "SWITCH READ", 3 is initially loaded into the counter NPS, the flag FTII is set to "1" and the status of the K port is read in this subroutine. If the status of the K port is equal to "1111B", namely, if all the switches connected to the P ports for which the low level L is established are off, the flag FTIM is reset to "0" immediately exiting from the subroutine. If the K port is not equal to "1111B", a determination is made to see which one of the switches has been depressed, in a manner mentioned below. Initially, 4 bit data entered from the K port is shifted by one bit toward the least significant bit, as indicated by "ROR" in this Figure. If bit 0 of the data is equal to "1", the shifting operation results in setting the internal carry flag of CPU 110 to "1". However, if the bit is equal to "0", the carry flag will be equal to "0". Each bit 3, 2, 1 and 0 of the data corresponds to K3, K2, K1 and K0 of the K port. In this manner, the status of the port K0 is examined during the initial shift.

The flag FTII is initially set to "0", and is set to "1" upon detecting the on condition of the switch. If the carry flag is equal to "1" as a result of the shifting operation, or if the switch for the corresponding bit is off, the status of the flag FTII is examined. Since it is initially equal to "0", the counter NK is incremented by on while the counter NPS is decremented by one, and if the latter does not become negative, the program returns to the processing operation labelled "SUB1". Since 3 is initially loaded into the counter NPS, unless "0" is detected for the carry flag by shifting the data, this operation will be repeated four times at maximum.

When "0" is detected for the carry flag as a result of the shifting operation, the flag FTII is examined. Since this flag is initially equal to "0", the flag FTII is now set to "1", the counter NK is incremented by one and the counter NPS is decremented by one. If the latter counter does not become negative, the program returns to the processing operation labelled "SUB1".

After the flag FTII is set to "1" or after detecting the on condition of the switch, the counter NK is not updated subsequent to the bit shifting operation. However, in the event "0" is detected for the carry flag again after the flag FTII is set to "1", the flag FTIM is reset to "0", exiting from this routine. Thus, at the time when the described processing operation has been completed, the count in the counter NK is determined in accordance with the initially loaded value and the bit number for which the on condition of the switch is detected. Specifically, if the on condition of the switch is detected for the bit 0, 1, 2 and 3 of the K port, the counter NK counts up for the first time, for the second time, for the third time, and for the fourth time, respectively.

Referring to FIGS. 7e, 7f, 7g and 7h again, the respective subroutines "P0MODE", "P1MODE", "P3MODE" and "P4MODE", initially load 15, 3, 7 and 11 into the counter NK before the execution of the subroutine "SWITCH READ". Specifically, when a switch bank connected to the output ports P0, P1, P2 and P3 is to be read, the counter NK has an initial count of 15, 3, 7 and 11, respectively. Since the counter NK is a four bit counter or hexadecimal counter, if the switches SW1, SW2 and SW3 connected to the output port P0 is turned on, the counter NK has a count of 0, 1, and 2, respectively. If a switch is connected to the line extending from the port K3 and to the line extending from the port P0, the counter NK has a count of 3 when such switch is turned on. Similarly, if four switches are connected to the port P1, the counter NK has a count of 4, 5, 6 and 7, respectively, when the respective switch is turned on. If four switches are connected to the port P2, the counter NK has a count of 8, 9, 10 and 11, respectively, when the respective switch is turned on. If four switches are connected to the port P3, the counter NK has a count of 12, 13, 14 and 15, respectively, when the respective switch is turned on.

Returning to FIG. 6*d* to continue the description thereof, as the counter NPS becomes negative, the count in the counter NK is compared against the content of the memory SS. Since the memory SS is initially cleared to 0, no match result. In this event, the count in the counter NK is stored in the memory SS, the counter NS is reset to 0 and the flag FTIM is reset to "0", thus exiting from this routine.

Figure 7A:
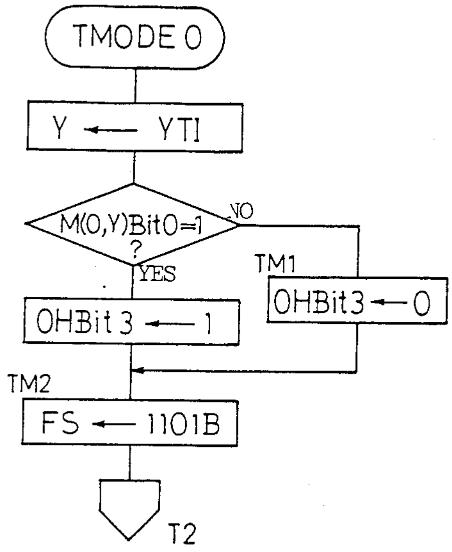
Figure 7B:
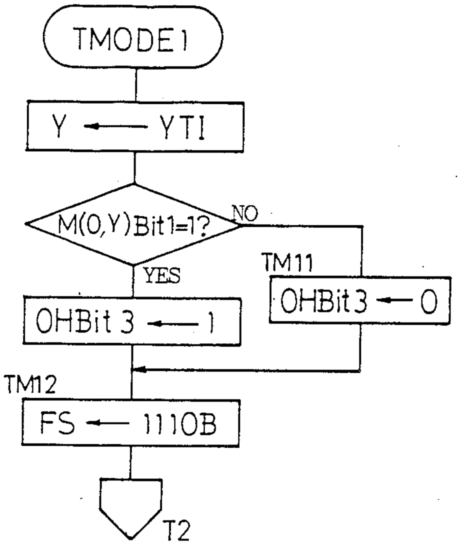
Figure 7C:
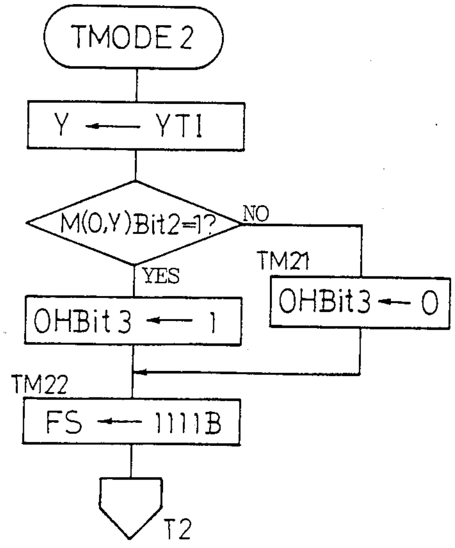
Figure 7D:
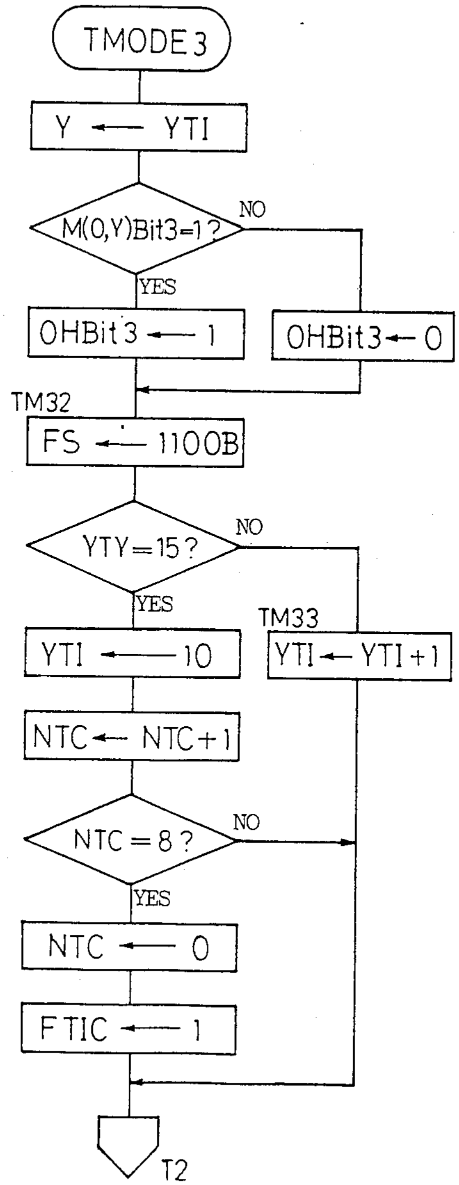
Figure 7E:
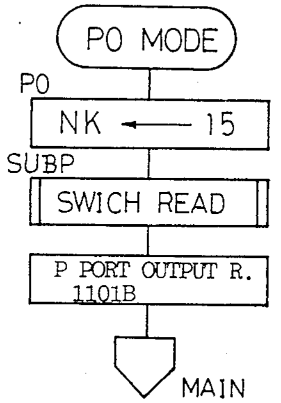
Figure 7F:
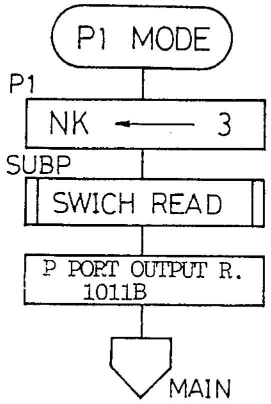

Upon completion of the subroutine "SWITCH READ", the subroutine "P0MODE" is entered wherein "1101B" is stored in the P port output register M(0, 6). Accordingly, at the next time the flag FTIM is set to "1" when about 2.6 msec has passed, the bit 1 of the register M(0, 6) is equal to "0", and hence the subroutine "P1MODE" is executed (see FIG. 6*b*). Referring to FIG. 7*f*, in the subroutine "P1MODE", 3 is loaded into the counter NK, the subroutine "SWITCH READ" is executed, and "1011B" is stored in the P port output register M(0, 6). This makes the bit 2 of the register M(0, 6) equal to "0", so that at the next time the flag FTIM is set to "1", the subroutine "P2MODE" is executed (see FIG. 6*b*).

Figure 7G:
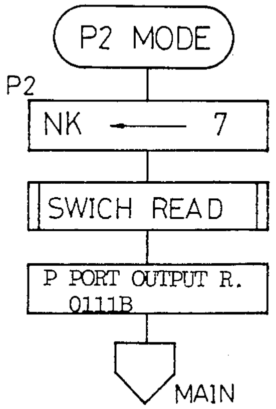

Referring to FIG. 7*g*, in the subroutine "P2MODE", 7 is loaded into the counter NK, the subroutine "SWITCH READ" is executed, and "0111B" is stored in the P port output register M(0, 6). This makes the bit 3 of the register M(0, 6) equal to "0", so that at the next time the flag FTIM is set to "1", the subroutine "P3MODE" is executed (see FIG. 6*b*).

Figure 7H:
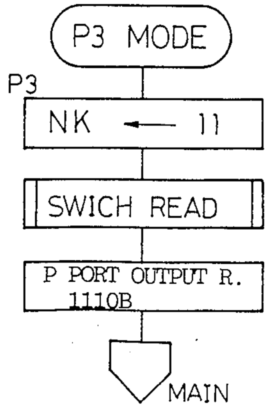

Referring to FIG. 7*h*, in the subroutine "P3MODE", 11 is loaded into the counter NK, the subroutine "SWITCH READ" is executed, and "1110B" is stored in the P port output register M(0, 6). This makes the bit 0 of the register M(0, 6) equal to "0", so that at the next time the flag FTIM is set to "1", the subroutine "P2MODE" is executed (see FIG. 6*b*). In this manner, the four subroutines "P0MODE". "P1MODE", "P2MODE" and "P3MODE" are sequentially and repeatedly executed with a period of about 2.6 msec.

Returning to FIG. 6*d*, the subroutine "SWITCH READ" will be described. When the four bit shifting operations of data which is read from the K port have been completed and the counter NPS becomes negative, the count in the counter NK matches the content of the memory SS when the comparison therebetween takes place during a second and subsequent pass since the four bit data including any bit for which the on condition of the switch has previously been detected is stored in the memory, and unless there is a change in the condition of the switch from the time of such detection until the current point in time. When a match is found, the counter NS is incremented by one, with a result being examined. If the counter NS is equal to or less than 15, the flag FTIM is reset to "0", and the program exists from this routine. Since the counter NS is cleared to "0" initially when the on condition of the switch is detected, and since it counts up each time a match between the memory SS and the counter NK is found, the count of the counter indicates the number of times the match is detected for the switch data. When the counter NS exceeds 15, the flag FS3 is examined. This flag is initially equal to "0", and then the content of the memory SS is stored in the buffers S0 to S3. The content of the memory SS is also stored in the buffers TS0 to TS3, the flag FS2 is set to "1", 0 is loaded into the counter NS and the flag FTIM is reset to "0", thus exiting from this subroutine. A data transmission or the delivery of a modulated signal does not take place from the transmitter when the flag FS2 is equal to "0". In other words, the modulated signal will not be delivered until after the on condition of the switch has been recognized 16 times consecutively by CPU 110 in response to the depression of the switch.

The time since the power supply is turned on until the modulated radio wave is delivered will now be considered. It is to be noted that the radio wave (carrier) begins to be delivered as soon as the power supply is turned on. It takes about 5 msec from turning either switch SW1, SW2 or SW3 on to the initiation of operation of CPU 110. After initiation of its operation, CPU 110 repeats the reading of the 16 bit identification code five times. The reading normally requires about 3 msec. CPU 110 then reads switch data, which reading requires about 10.4 msec. A reading of switch data is repeated 16 times, followed by initiation of the modulation. Accordingly, there is a time length of about 170 msec since the initial delivery of the radio wave (carrier) during which the modulated wave is not transmitted.

This is an important feature. Specifically, the presence or absence of a radio wave being received is determined by detecting any noise which may be present at the output of the FM domedulator of the receiver unit in the present embodiment. If the radio wave is modulated, it is difficult to distinguish the signal transmitted from the transmitter from noises, giving rise to the likelihood that an erroneous detection may result. However, the transmission of an unmodulated wave over a relatively long time interval of about 170 msec enables the receiver to recognize the reception of the radio wave to complete the self-holding action for the power supply during such interval, defeating any adverse effect of a subsequent erroneous decision which may be rendered by the receiver to declare the absence of a radio wave being received in response to a signal from the transmitter.

Referring to FIG. 6*e*, the timer interrupt service routine "TINT" will now be described. When the counter NTO becomes negative, the flag FS2 is examined. However, if 16 readings of switch data has been completed, the flag FS2 is set to "1" as mentioned previously. Hence the flag FS3 is then examined, which is initially equal to "0". Thus, the flag FS3 is set to "1", thus retaining data to be delivered to OHport. Bit 3 of memory OHout is set to "0". This means that the low level L is delivered to the signal line SG14 immediately thereafter.

Subsequent to the described operation, the timer interrupt service routine "TNIT" is re-entered and when the counter NTO becomes negative, the flags FS1 and FS0 are examined since the flag FS3 is now set to "1". If the flags FS1 and FS0 are equal to "0" and "0", respectively, the subroutine "TMODE0" is executed. If the flags FS1 and FS0 are equal to "0" and "1", respectively, the subroutine "TMODE1" is executed. If the flags FS1 and FS0 are equal to "1" and "0", respectively, the subroutine "TMODE2" is executed. When the flags FS1 and FS0 are equal to "1" and "1", respectively, the subroutine "TMODE3" is executed.

Briefly, in the subroutine "TMODE0", transmission data for bit 0 is processed. In the subroutine "TMODE1", transmission data for bit 1 is processed. Similarly, transmission data for bit 2 and bit 3 are processed in the subroutines "TMODE2" and "TMODE3", respectively. As a result of such processing operation, data comprising a given number of parallel bits are sequentially converted into serial data. By operating on the flags FS1 and FS0 in the individual subroutines, these subroutines are successively executed.

Referring to FIGS. *7a*, *7b*, *7c* and *7d*, the individual subroutines will be described. In the subroutine "TMODE0", the content of the memory YTI is initially loaded into the internal register Y, and bit 0 of the memory M(0, Y) is examined. If it is equal to "1", "1" is loaded into bit 3 of the memory OHout while if the bit 0 is equal to "0", "0" is loaded into bit 3 of the memory OHout. The flag FS is set to "1101B". This results in the flag FS1 being equal to "0" and the flag FS0 being equal to "1". Accordingly, when the timer interrupt service routine "TINT" is entered after about 2.6 msec, the subroutine "TMODE1" is executed.

In the subroutine "TMODE1", the content of the memory YTI is initially loaded into the internal register Y, and bit 1 of the memory M(0, Y) is examined. If it is equal to "1", "1" is loaded into bit 3 of the memory OHout while if the bit 1 is equal to "0", "0" is loaded into bit 3 of the memory OHout. The flag FS is set to "1110B". This makes the flag FS1 to be set to "1" and the flag FS0 to be reset to "0". Accordingly, when the timer interrupt service routine "TINT" is entered after about 2.6 msec subsequently, the subroutine "TMODE2" is executed.

In the subroutine "TMODE2", the content of the memory YTI is initially loaded into the internal register Y, and bit 2 of the memory M(0, Y) is examined. If it is equal to "1", "1" is loaded into bit 3 of the memory OHout while if it is equal to "0", "0" is loaded into bit 3 of the memory OHout. The flag FS is set to "1111B" This makes the flag FS1 to be set to "1" and the flag FS0 to be set to "1". Accordingly, when the timer interrupt service routine "TINT" is entered after about 2.6 msec subsequently, the subroutine "TMODE3" is executed.

In the subroutine "TMODE3", the content of the memory YTI is initially loaded into the internal register Y, and bit 3 of the memory M(0, Y) is examined. If it is equal to "1", "1" is loaded into bit 3 of the memory OHout while if it is equal to "0", "0" is loaded into bit 3 of the memory OHout. The flag FS is set to "1100B". This makes the flag FS1 to be reset to "0" and the flag FS0 to be reset to "0". Accordingly, when the timer interrupt service routine "TINT" is entered after about 2.6 msec subsequently, the subroutine "TMODE0" is executed. In the subroutine "TMODE3", the content of the memory YTI is examined to see if a single data transmission has been completed. If the transmission has not been completed, the content of the memory YTI is incremented by one.

An initial value of 10 is loaded into the memory YTI, and the content thereof is incremented by 1 after each execution of the subroutines "TMODE0", "TMODE1", "TMODE2" and "TMODE3". Thus, the memory M(0, Y) which is operated upon during the execution of these subroutines initially comprises the memory M(0, A) or the four bit data for the header, and is successively updated to the memory M(0, B), to M(0, C), to M(0, D), to M(0, E) and to M(0, F) after each completion of the output processing for the four bit data. Accordingly, when the memory YTI is examined and is found to be equal to 15, this means that the four bit header information, the four bit control information (switch data) S0 to S3 and the 16 bit identification code B0 to B15 have all been set up in the memory which is used for the transmission.

When the content of the memory YTI is found to be equal to 15, a value of 10 is then again loaded into this memory, the counter NTC is incremented by one, the content of which is then checked. If the count in the counter NTC is not equal to 8, the program exits from the subroutine "TMODE3". The counter NTC is initially reset to "0", and counts up for each completion of delivery of 24 bit data. The delivery of 24 bit data is repeated until the counter NTC reaches a count of 8. In other words, once either switch SW1, SW2 or SW3 is operated, 24 bit serial data is repeatedly delivered for a total of eight times. When the counter NTC reaches a count of 8, this counter is cleared to 0 while the flag FTIC is set to "1".

The generation of the pumping signal will be described with reference to the timer interrupt service routine "TINT" shown in FIG. *6f*. When the counter NTO counts down to "0", the flag FTIO is set to "1" while the counter NPO is decremented by 1. Unless the count in the counter NPO is negative, bit 0 of the memory OHout or the condition on the signal line SG13 is examined, and bit 0 of the memory OHout is set according to the binary status on the signal line. Thus, "0" will be loaded into the bit 0 when the condition on the signal line SG3 is equal to "1", and "0" will be loaded into the bit 0 if the signal line has the condition corresponding to "0".

It will be noted that the timer interrupt service routine "TINT" is executed every 260 μsec while the counter NTO will reach a count of 0 at a rate of one per ten times. Accordingly, the status of bit 0 of the memory OHout will be inverted every about 2.6 msec. Bit 0 of the memory OHout is delivered to the port O4. Accordingly, a square signal having a period of about 5.2 msec appears on the signal line SG13 after timer interrupt is enabled. This signal turns the transistor Q5 on and the transistor Q6 on in the power supply circuit 120, thus maintaining the transistor Q7 on.

However, when the counter NPO becomes negative as a result of its down-counting operation, the counter NPO is reset to 0, ceasing the generation of the pumping signal or updating bit 0 of the memory OHout. If the counter NPO is now reset to 0, the counter will still be negative when it further counts down, so that once it is reset to 0, the counter NPO cannot be set to a value which exceeds 0 by the interrupt service routine "TINT".

Reference is now made to the main routine shown in FIGS. *6a*, *6b*, *6c* and *6d*. It will be noted that 15 is loaded into the counter NPO at the processing step which immediately follows the label "MAIN" in th main routine. It will be noted that this processing step is included in the loop which is followed during the subsequent operation, the counter NPO is repeatedly preset to 15 after each execution of the loop operation, whereby the counter NPO cannot have a count of 0 as long as the loop operation is being executed.

The counter NPO may have a count of 0 when a value in the software timer having its value stored in the memories TC1, TC2 and TC3 reaches a given count. In the loop operation, when the flag FTIM is not equal to "1", the flag FTIO is examined. The flag FTIO is set to "1" with a period of about 2.6 msec during the interrupt service routine "TINT" mentioned above. If the flag FTIO is equal to "1", the flag FTIO is cleared to "0", followed by incrementing the content of the memory TC1 in the looping operation of the main routine. If the result exceeds 15 or if an overflow occurs, the content of the memory TC2 is incremented. If the result again exceeds 15, the content of the memory TG3 is incremented.

An initial value of 0 is loaded into the memories TC1, TC2 and TC3. Each time the flag FITO is set to "1" or every 2.6 msec, the software timer counts up. When the memory TC1 counts up 16 times, the memory TC2 counts up by one, and when the memory TC2 counts 16 times, the memory TC3 counts up by one. When the memory TC3 has a content of 2, indicating that an upcounting operation has taken place 512 times, an overflow from the software timer is detected to proceed to the next processing. Initially, the counter NPO is cleared to 0, the flags FS1, FS2, FS3 and FS4 are cleared to "0", followed by the repeated looping operation. In the looping operation, the high level H is set up at all of the output ports O0, O1, O2 and O3 while the P port output register M(0, 6) is set to "1111B", the OH port output register M(0, 7) is set to "0101B" and the memory AOH is set to "0101B", subsequently repeating the same processing operation. Consequently, when the software timer times out, the counter NPO has a count of 0, ceasing the delivery of the pumping signal to turn the power supply circuit 120 off.

Before the software timer times out, the memories TC1, TC2 and TC3 are cleared to the initial value of 0 unless the flag FSS2 is already set to "1" at the time the modulation is initiated or when the flag FS3 is set to "1". The memories TC1, TC2 and TC3 are also cleared when the content of the memories S3 to S0 which maintain the switch data is different from the content of the buffer memories TS3 to TS0 after the delivery of 24 bit data eight times is completed or when the flag FTIC is set to "1".

With the described embodiment, the power dissipation on the part of the receiver can be reduced when no radio wave is received from the transmitter, but power of a given level is supplied to various parts of the receiver whenever a radio wave is received to enable a given operation, thus enabling the receiver to be maintained on. There is no need to provide a power switch, and a wireless remote control is always enabled. On the transmitting side, an unmodulated carrier is transmitted before initiating the data transmission, and this enables a simple discrimination on the receiving side of a standby condition through a determination of the presence or absence of any carrier being received. The power supply to the receiver is automatically controlled in accordance with the result of such discrimination, thus minimizing the power dissipation of the receiver. By providing a sufficiently long unmodulated period, the receiver can be prepared to provide a full functioning before the transmitter begins to transmit data, thus allowing a data transmission which is free from any likelihood of failure of reception.

What is claimed is:

1. A data transmission system comprising a data transmitter unit including at least one switch means, wave generating means, and first electronic control means responsive to an operation of the switch means to control carrier output means to provide a carrier output from a wave generating means and to control modulation means to initiate a modulation of the carrier with a modulation signal including information which depends upon the operation of the switch means at least a given time interval after the beginning of the carrier output;

and a data receiver under including switching control means for controlling a given electrical instrument, wave receiving means including demodulation means for receiving a wave generated by the wave generating means and delivering a given electrical information signal in response thereto, second electronic control means for decoding information contained in the electrical information signal which is demodulated by the demodulation means and for controlling the switching control means accordingly, wave reception decision means for monitoring the electrical information signal which is output from the wave receiving means and for determining the presence or absence of a wave from said wave generating means being received to deliver a corresponding electrical control signal, power supply means for supplying power to said wave receiving means and said second electric control means and power switching responsive to the electrical control signal which is ouput from the wave reception decision means to switch at least the power which is supplied to the second electronic control means, wherein the second electronic control means is effective to apply an A.C. signal to the power switching means to achieve a self-holding action for a power supply whenever the power supply is turned on and to interrupt the power supply to the second electronic control means itself by interrupting the application of the A.C. signal after a given time interval thereafter.

2. A data transmission system comprising a data transmitter unit including at least one switch means, wave generating means, and first electronic control means responsive to an operation of the switch means to control carrier output means to provide a carrier output from the wave generating means and to control modulation means to initiate a modulation of the carrier with a modulation signal including information which depends upon the operation of the switch means at least a given time interval after the beginning of the carrier output;

and a data receiver under including switching control means for controlling a given electrical instrument, wave receiving means including demodulation means for receiving a wave generated by the wave generating means and delivering a given electrical information signal in response thereto, second electronic control means for decoding information contained in the electrical information signal which is demodulated by the demodulation means and for controlling the switching control means accordingly, wave reception decision means for monitoring the electrical information signal which is output from the wave receiving means and for determining the presence or absence of a wave from said wave generating means being received to deliver a corresponding electrical control signal, power supply means for supplying power to said wave receiving means and said second electric control means and power switching means responsive to the electrical control signal which is output from the wave reception decision means to switch at least the power which is supplied to the second electronic control means, wherein the first electronic control means includes a power supply and switching control means which controls the power supply to itself in an on and off manner, the switching control means normally turning the power supply off and turning the power supply on whenever the switch means is turned on, and in which the first electronic control means applies an A.C. signal to the switching control means when power is supplied thereto to achieve a self-holding action for the supply of the power and to cease the application of the A.C. signal to the switching control means to interrupt the supply of power thereto at least a given time interval thereafter.

* * * * *